(12) United States Patent
Kaptelinin

(10) Patent No.: US 7,770,130 B1
(45) Date of Patent: Aug. 3, 2010

(54) NON-DISTRACTING TEMPORARY VISUAL CLUES FOR SCROLLING

(76) Inventor: Viktor Kaptelinin, Stipendiegrānd 2F-0101, Umeå (SE) 90735

( * ) Notice: Subject to any disclaimer, the term of this patent is extended or adjusted under 35 U.S.C. 154(b) by 726 days.

(21) Appl. No.: 10/067,673

(22) Filed: Feb. 7, 2002

(51) Int. Cl.
*G06F 3/048* (2006.01)

(52) U.S. Cl. ................ 715/787; 715/251; 715/784; 715/785; 715/786

(58) Field of Classification Search ......... 715/784–787, 715/251, 253, 256, 273
See application file for complete search history.

(56) References Cited

U.S. PATENT DOCUMENTS

| | | | | |
|---|---|---|---|---|
| 5,973,663 | A * | 10/1999 | Bates et al. | 345/786 |
| 6,177,938 | B1 * | 1/2001 | Gould | 345/784 |
| 6,204,846 | B1 * | 3/2001 | Little et al. | 715/784 |
| 6,476,831 | B1 * | 11/2002 | Wirth et al. | 715/784 |
| 6,590,595 | B1 * | 7/2003 | Wagner et al. | 715/784 |
| 6,738,084 | B1 * | 5/2004 | Kelley et al. | 345/784 |
| 6,750,886 | B1 * | 6/2004 | Bergstedt | 715/784 |
| 6,803,930 | B1 * | 10/2004 | Simonson | 715/784 |
| 2002/0126154 | A1 * | 9/2002 | Watson | 345/784 |
| 2002/0186252 | A1 * | 12/2002 | Himmel et al. | 345/787 |
| 2003/0137522 | A1 * | 7/2003 | Kaasila et al. | 345/619 |

OTHER PUBLICATIONS

Kaptelinin, V., Mäntylä ., T., Åström, J. Transient visual cues for scrolling: an empirical study. CHI 02: ACM Conference. Extended Abstracts, 2002, pp. 620-621.

Kaptelinin, V. A comparison of four navigation techniques in a 2D browsing task. CHI 95: ACM Conference. Conference Companion, 1995, pp. 282-283.

Åström, J. (unpublished manuscript) Lättläst på dataskärmen: Transienta visuella ledtrådar som hjälpmedel. Umeå, 2001.

English translation of the title and relevant portions of Åstrom, 2001 (item D above).

Ware, C. Pre-attentive processing. In: Information Visualization: Perception for Design. San Francisco: Morgan Kauffmann, 2000, pp. 163-168.

Andersen T. H. A simple movement time model for scrolling. CHI '05 extended abstracts on Human factors in computing systems. 2005, 1180-1183.

Klein, C. & Bedersen, B. B. Benefits of animated scrolling. CHI '05 extended abstracts on Human factors in computing systems. 2005, 1965-1968.

* cited by examiner

*Primary Examiner*—Ba Huynh

(57) ABSTRACT

A method and apparatus for helping a user to locate new information displayed in a window on a computer display after scrolling the window to a new portion of a document by providing temporary visual clues distinguishing "old" information, also displayed in the window before scrolling, from information not displayed in the window before scrolling. The visual clues are displayed only if the "old" information is displayed in the window before scrolling for more than a predetermined amount of time. According to preferred embodiments the temporary visual clues are implemented to avoid user distraction from his or her main task.

12 Claims, 28 Drawing Sheets habitually skip, for example, the first line and focus directly on the second line using its spatial location as a cue. The usefulness of this strategy, however, is limited because the number of overlapping lines may vary between applications. Besides, when a window is scrolled to the last portion of a document new contents can begin anywhere on the page. Therefore, the only reliable

Existing systems provide little support for solving that task. In many applications a fixed number of overlapping lines is typically displayed. Therefore, the user may habitually skip, for example, the first line and focus directly on the second line using its spatial location as a cue. The usefulness of this strategy, however, is limited because the number of overlapping lines may vary

FIG. 4A cue. The usefulness of this strategy, however, is limited because the number of overlapping lines may vary between applications. Besides, when a window is scrolled to the last portion of a document new contents can begin anywhere on the page. Therefore, the only reliable strategy helping the user to locate new contents in a window is using the meaning of information displayed in

40

FIG. 4B

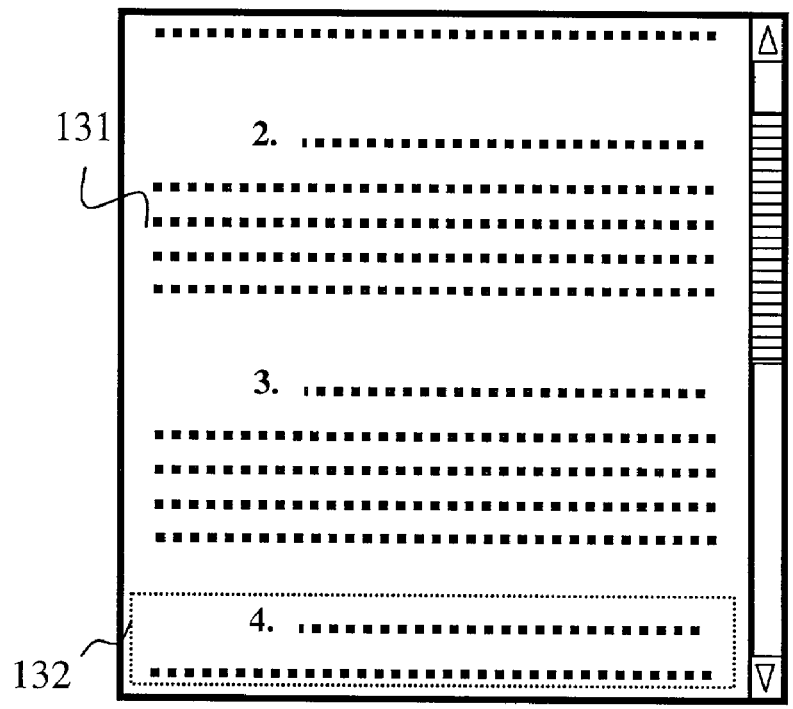
FIG. 6A          130
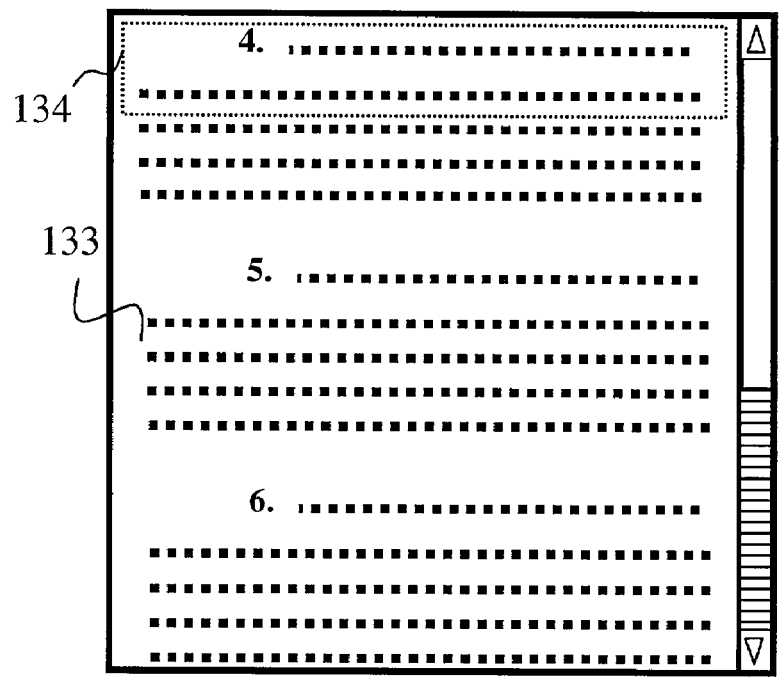
FIG. 6B          130

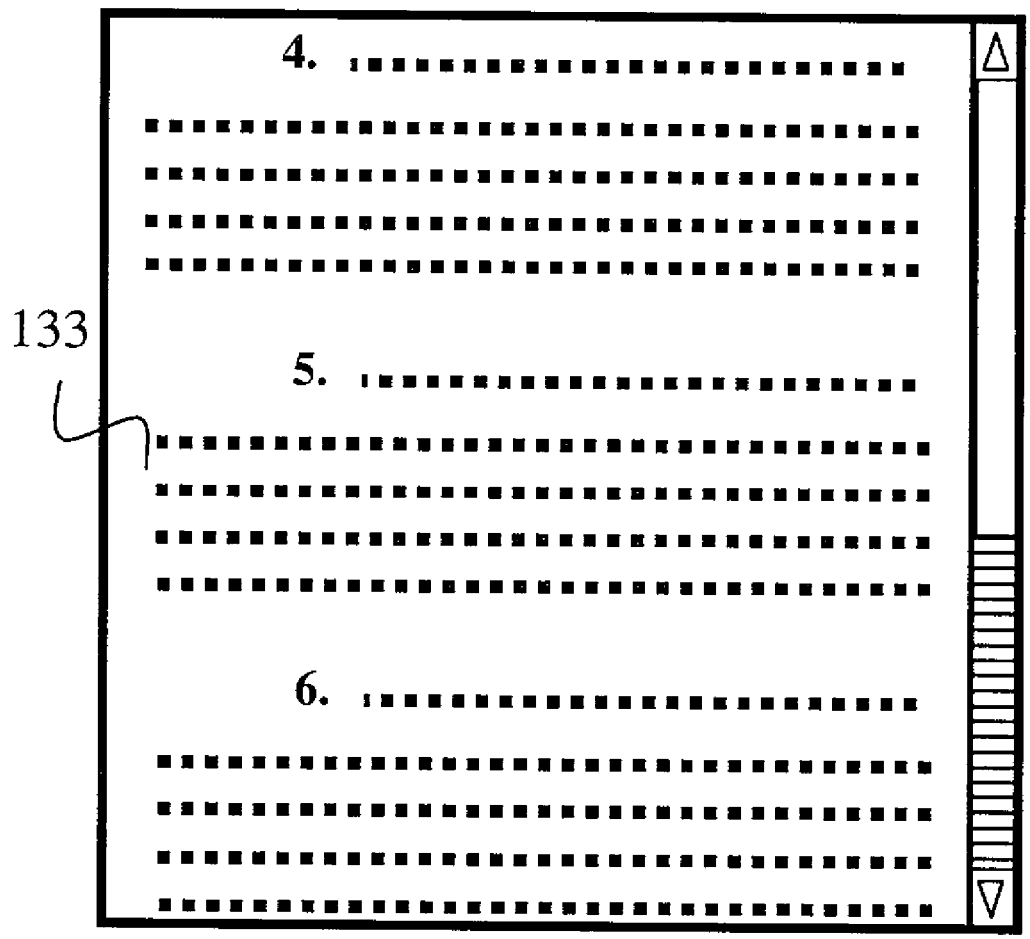
FIG. 6C    130

550 habitually skip, for example, the first line and focus directly on the second line using its spatial location as a cue. The usefulness of this strategy, however, is limited because the number of overlapping lines may vary between applications. Besides, when a window is scrolled to the last portion of a document new contents can begin anywhere on the page. Therefore, the only reliable

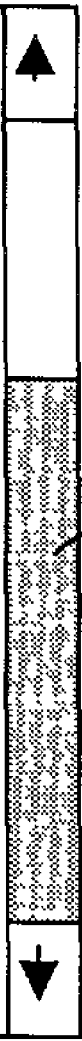

NON-DISTRACTING TEMPORARY VISUAL CLUES FOR SCROLLING

CROSS-REFERENCE TO RELATED APPLICATIONS

Non-provisional patent application of Viktor Kaptelinin, Ser. No. 09/915,075 filed Jul. 25, 2001, and later abandoned.

FEDERALLY SPONSORED RESEARCH

Not Applicable

SEQUENCE LISTING OR PROGRAM

Not Applicable

BACKGROUND

1. Field of Invention

This invention relates to computers and computer software. More specifically, this invention relates to displaying information in a window on a computer display, when a window displays only part of its related information.

2. Description of Prior Art

When a computer user views an image in a window, the image can be a text, a picture, a movie, a content of a computer folder, etc., the window often displays only a portion of its related information. To view other portions a user needs to scroll the window. In current Graphical User Interfaces (GUIs) scrolling is typically carried out with a scroll bar. There are also other techniques, such as dragging, zooming, using a navigation map, and the like. In the present description all these techniques are referred to as scrolling. Therefore, scrolling is understood here in a broad sense, in the spirit of the U.S. Patent Classification System, which, for instance, gives the following description of subclass 784 of class 345: "Window scrolling: This subclass is indented under subclass 781. Subject matter wherein, when a window displays only part of its related information, the user can selectively control which portion is displayed." (Class 345, Computer graphics processing, operator interface processing, and selective visual display systems. Class definition. Downloaded from the official website of the USPTO on Jan. 1, 2002). In the context of the present invention scrolling is understood as any method or technique used to make a window display a different portion of its related information. Besides, scrolling in the context of the present invention includes not only scrolling controlled by a user, but also autoscrolling, scrolling of items on a menu, resizing of a window, and the like.

Even though the basic principles of the current invention apply to all types of scrolling, in the description below these basic principles are illustrated with scrolling windows most typical of current GUI environments, such as operating systems for personal digital assistants (PDAs) or personal computers (PCs). Windows typical of current operating systems for PCs, such as Mac OS or Microsoft Windows, feature scroll bars, so that a user can scroll through a content by a large increment, substantially the whole "page", or by a small increment, for example one line of text or one row of icons at a time. FIG. 1 depicts a window 10, which is a part of a GUI provided by an operating system, such as Windows 2000, or by a browser that accesses and displays information from the Internet; or by a word processing program; or by other software through which a user can view information. A content 12 depicted in FIG. 1 is a document consisting of lines of text, schematically represented in FIG. 1 as digits and broken lines. The window 10 could contain not only texts but also graphical representations of objects or other information. The window 10 further includes a scroll bar 13.

The content 12 may contain more information than can be displayed in the window 10 at the same time. FIG. 1A depicts a portion 11 of the content 12 that is displayed in the window 10. The scroll bar 13 allows a user to scroll through portions of the content 12, which are not immediately displayed in the window 10. The scroll bar 13 includes a scroll shaft 14, a scroll box 15, and scroll arrows 16 and 17. By clicking on the scroll arrows 16 or 17, the user can scroll up or down by a small increment, such as one line of text. By clicking on the scroll shaft 14 above or below the scroll box 15 a user can scroll the content by a large increment, substantially the whole page displayed in the window 10. FIG. 1B depicts the window 10 after it has been scrolled down by a large increment. Although not depicted, the window 10 may also include a horizontal scroll bar.

FIG. 2 depicts a screen 20 that may be provided on a handheld computer device, such as a PDA. The screen displays records 21, schematically depicted as broken lines. The screen displays only a portion of all records on a list. To see another portion of the records a user has to scroll through the list, for example by touching a triangle-shaped control 22 on the screen. Windows of the type depicted in FIG. 2 are typical of small screen devices, such as PDAs, mobile phones, other wireless devices, computer games, control components of various equipment, etc. These windows in most cases are substantially of the same size as the screen itself, and often it is possible to provide only one window on a display.

Scrolling windows of the types shown in FIG. 1 and FIG. 2, as well as other possible types, are within the scope of the present invention.

The present invention addresses a common problem associated with scrolling windows: users often "loose their place" on the page after scrolling. When a window is scrolled, new page usually does not start with new information, that is, information not displayed before scrolling. There is typically an overlapping between the currently displayed portion and the previous portion. For example, as shown in FIG. 1B, scrolling through a text by a large increment, by clicking on the scroll shaft 14 or by pressing a PageDn key on a keyboard (not depicted in FIG. 1), may result in displaying a new portion 18 of the content 12 in the window 10; the portion 18 begins with two lines of text that overlap from the portion 12.

There may be good reasons for such an overlapping. In particular, it might help the user relate new text fragments displayed after scrolling to what the user had read before scrolling and thus support the continuity of attention and understanding.

However, possible advantages of such an overlapping come at a price: locating new information on a page becomes a more complex cognitive task. When a portion of content displayed after scrolling contains information also displayed before scrolling, that is, an "old" information, a user in many cases may desire not to process that old information over again. A user will try to locate the place where old information ends and new information begins to focus on new information. Existing systems provide little support for solving that task. In many applications a fixed number of overlapping lines is typically displayed. Therefore, the user may habitually skip, for example, the first line and focus directly on the second line using its spatial location as a clue. The usefulness of this strategy, however, is limited because the number of overlapping lines may vary between applications. Besides, when a window is scrolled to the last portion of a document new contents can begin anywhere on the page. Therefore, the only effective strategy for locating new information on a page is reading or browsing through all information from the beginning of a page (for instance, in case of scrolling down, from the top of a page) until new information is located. The user has to use the meaning of information to differentiate new information from old information. This strategy is more effort and time consuming comparing to relying on visual clues for locating new information.

None of the above techniques provides effective visual clues for cases when the user scrolls quickly through the content.

BRIEF SUMMARY OF THE INVENTION

The present invention provides a method and apparatus for aiding a user in viewing information on a computer system including a display. The information is displayed in a window, which can display only a portion of its related information at the same time. The system and method comprise providing temporary visual clues to help a user determine where new information, not displayed in the window before scrolling, is located in the window after scrolling relative to old information, that is, information that overlaps from the previous view and has been displayed in the previous view for more than a predetermined amount of time. The preferred embodiments disclose temporary visual clues implemented to minimize distraction of a user from his or her main task.

BRIEF DESCRIPTION OF THE DRAWINGS

FIG. 3A, FIG. 3B, and FIG. 3C are diagrams depicting two large triangle-shaped screen object temporarily emerging on the screen after scrolling to indicate the border between processed and not processed information.

FIG. 4A, FIG. 4B, and FIG. 4C are diagrams depicting a window displaying a text that is first scrolled ten lines down and immediately after that scrolled five lines up.

FIGS. 5-1 and FIGS. 5-2 are flow charts depicting a method in accordance with the first embodiment of the present invention.

FIG. 6A, FIG. 6B, and FIG. 6C are diagrams of a computer display in accordance with the first embodiment of the present invention depicting lines of text from a pre-scroll view appearing in a post-scroll view being temporarily displayed in gray color.

FIGS. 7-1, FIGS. 7-2, and FIGS. 7-3 are flow charts depicting a method in accordance with the second embodiment of the present invention.

FIGS. 9-1 and FIGS. 9-2 are flow charts depicting a method in accordance with the third embodiment of the present invention.

FIGS. 11-1 and FIGS. 11-2 are flow charts depicting a method in accordance with the fourth embodiment of the present invention.

FIGS. 13-1 and FIGS. 13-2 are flow charts depicting a method in accordance with the fifth embodiment of the present invention.

FIG. 14A, FIG. 14B, and FIG. 14C are diagrams of the computer display in accordance with the fifth embodiment of the present invention depicting the use of a marginal marker during vertical scrolling of a window through a text.

DETAILED DESCRIPTION OF THE INVENTION

The underlying ideas of the present invention can be described as follows.

1. Non-Distracting Visual Clues

The most serious potential problem with temporary visual clues is that their use may distract a user from his or her main task. In that case temporary visual clues may be detrimental rather then helpful. The objective of using temporary visual clues is to avoid distraction caused by the task of locating new information in a window. If temporary visual clues themselves cause a distraction, they are not useful.

Figure 3A:
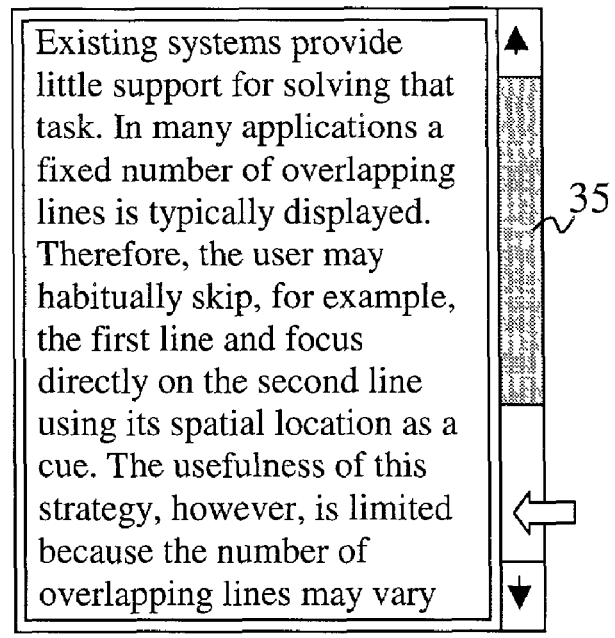
Figure 3B:
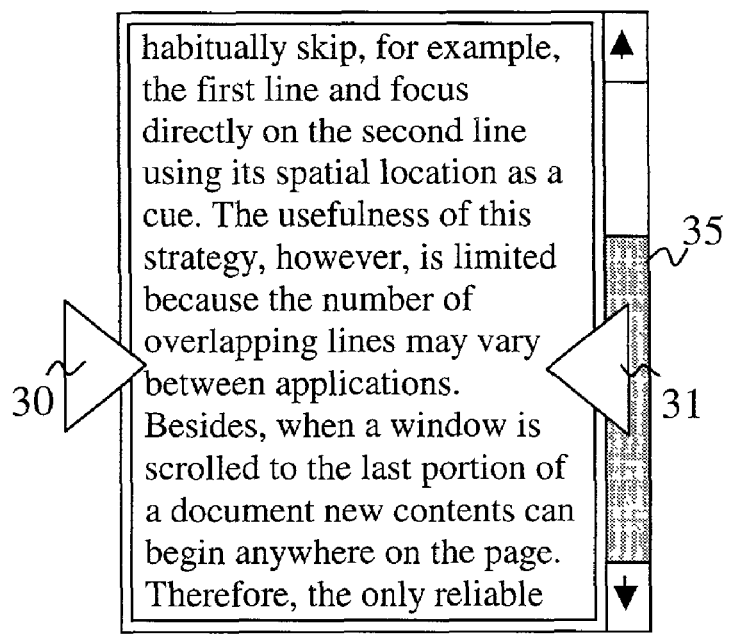
Figures 1, 7:
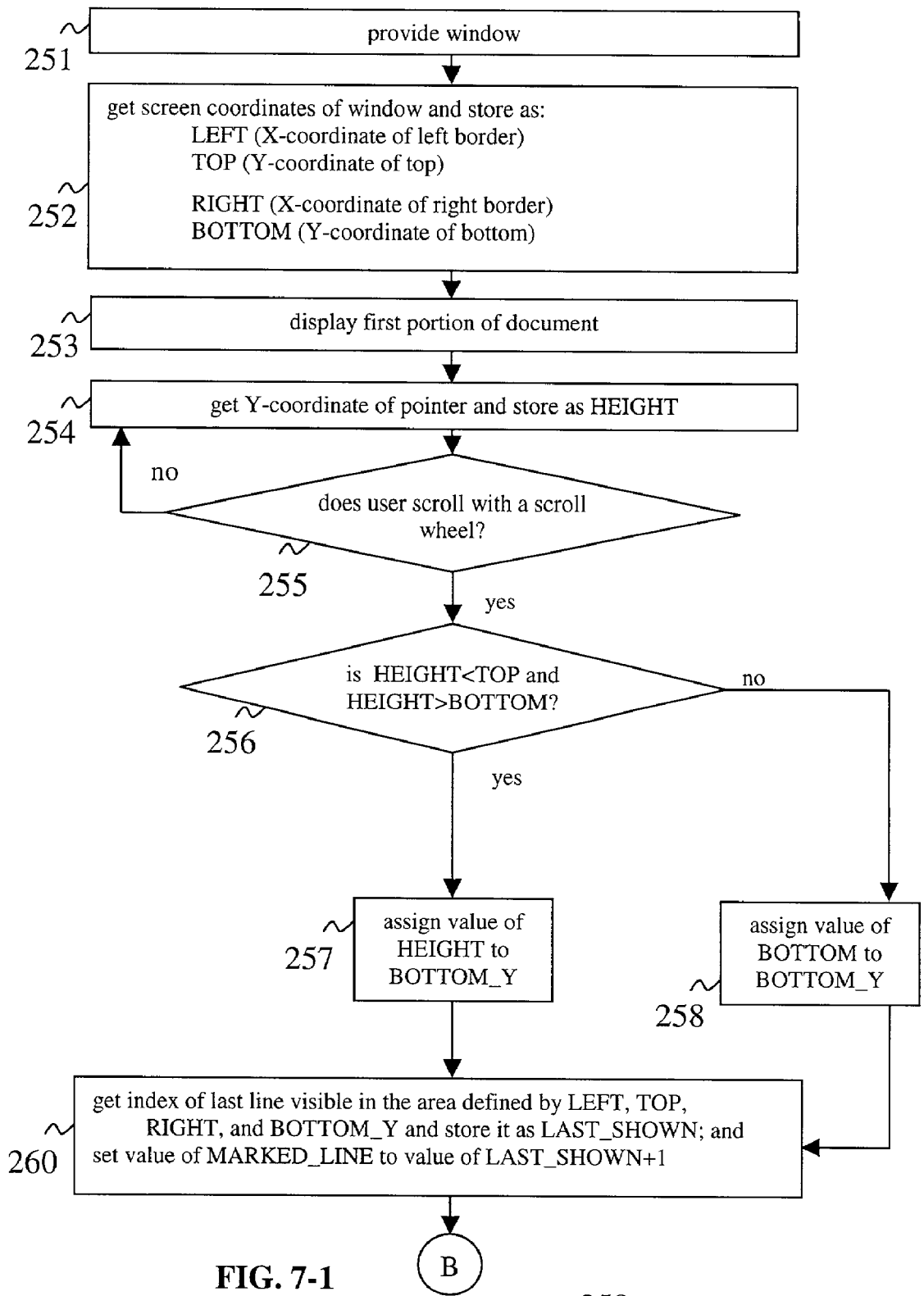
Figures 2, 7:
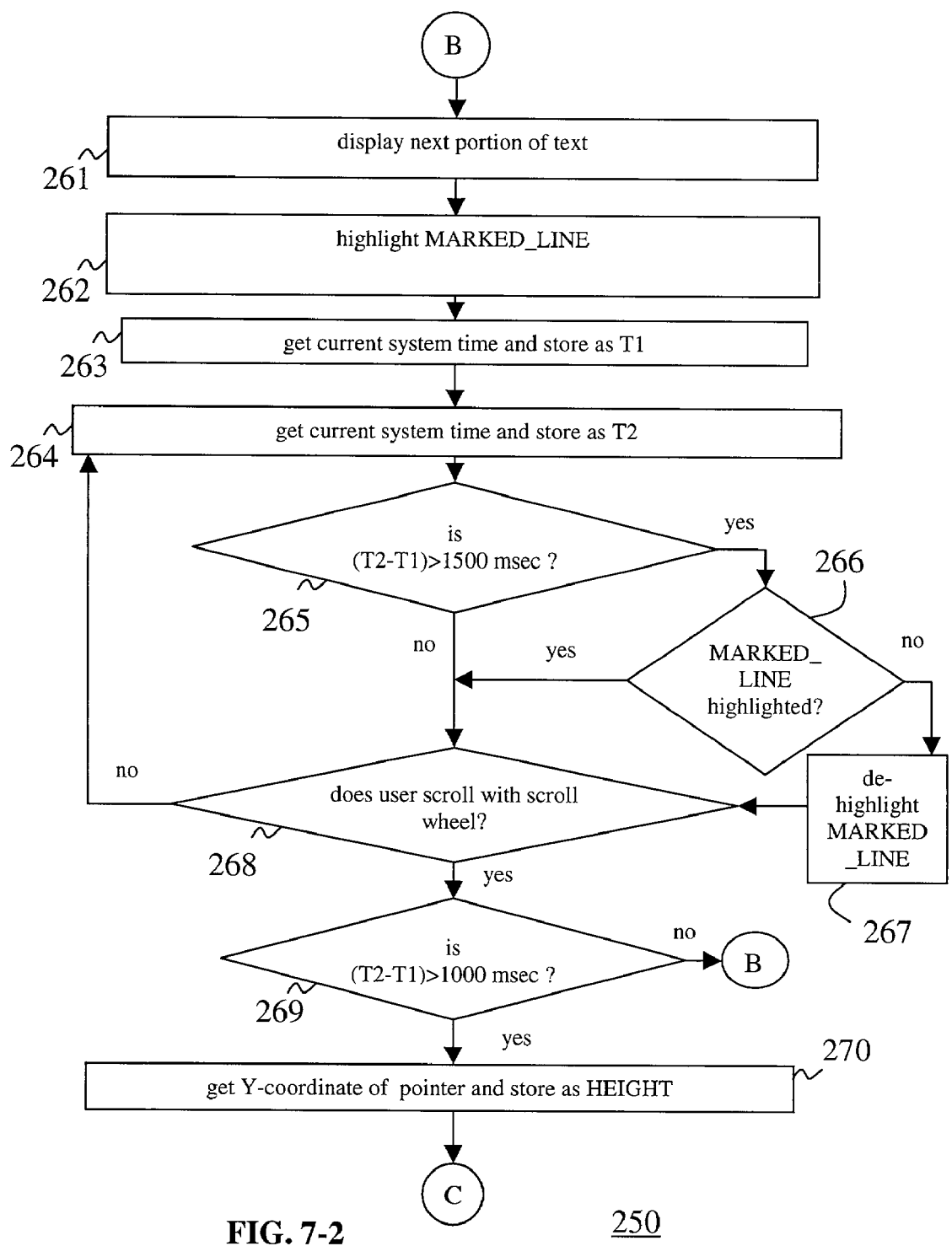
Figures 3, 7:
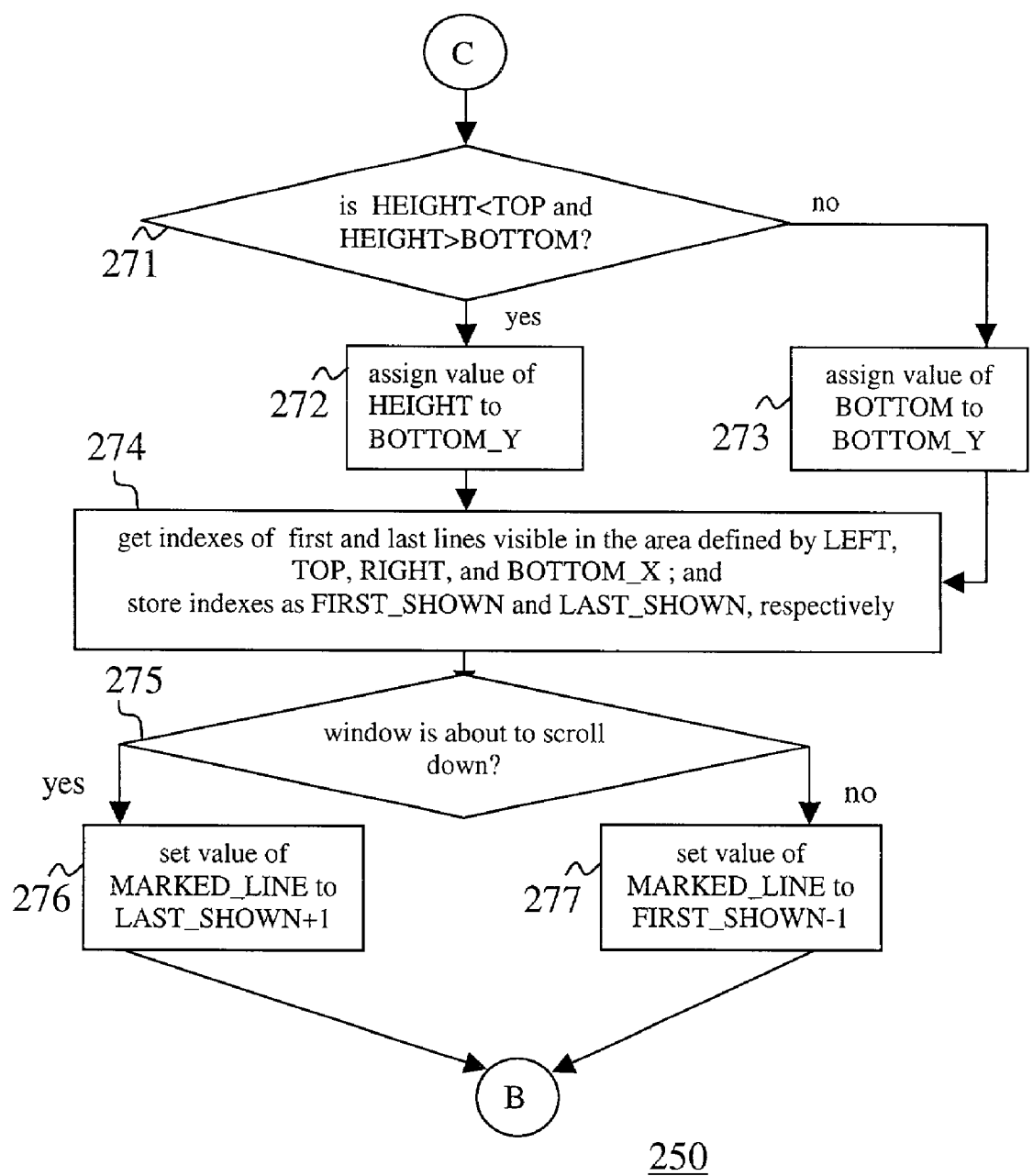

A straightforward approach to implementing temporary visual clues for scrolling is to provide new screen objects, or shapes, that emerge on the screen immediately after scrolling and indicate the border between old and new contents. FIG. 3 is depicting an example of such an approach. When a text window (FIG. 3A) is scrolled by clicking on scroll shaft below a scroll box 35, a triangle 30 and a triangle 31 are displayed in the window immediately after scrolling. The triangles 30 and 31 point to the border separating "old" (overlapping from the previous view) and new text lines (FIG. 3B). The triangles 30 and 31 are displayed for 1 second. After that the triangles 30 and 31 start to gradually disappear and in 1.5 seconds after scrolling the window looks as a regular scroll window (FIG. 3C).

Implementing temporary visual clues as emerging screen objects, for instance as depicted in FIG. 3, can be helpful in certain cases and it is covered by the present invention. However, using emerging objects as temporary visual clues may have serious disadvantages and is potentially problematic. There are two main problems associated with this approach.

First, new objects appearing on the screen are powerful distractors. User's attention is likely to be directed away from reading or browsing information in a window. Appearing and disappearing screen objects may give the feeling of "blinking" or "flashing" and can be rather irritating.

Second, emerging screen objects do not give a direct indication of where new information is located on a page. A user should infer the location of new information on the basis of perceptual analysis of temporary visual clues. For instance, if the triangles 30 and 31 depicted in FIG. 3 are used to help a user locate new information on the page after scrolling, the user first needs to perceive the shape, location, and orientation of the triangles 30 and 31. Then, knowing that the direction of scrolling is down the user can make a conclusion that new information begins immediately below an imaginary line connecting the triangle 30 and the triangle 31. Finally, the user focuses on information located in the left area of the window immediately below the imaginary line connecting the triangle 30 and the triangle 31. Cognitive tasks of the above type are not very complex but if constantly performed they can significantly increase the cognitive effort needed to use a technology.

The present invention, as illustrated by preferred embodiments described below, addresses the above two problems by:

(a) Minimizing the visual salience of visual clues intended to help a user locate new (not processed) information on a page. This is achieved by minimizing the size, brightness, contrast, and other attributes that may distract user's attention.

(b) Some visual attributes, such as color, orientation, texture, or gloss can be processed without paying attention to those attributes. Using these attributes is likely to minimize distraction of user's attention.

(c) Using visual clues to directly indicate relevant information in a window. This is achieved by making the relation between the visual clues and new information as immediate as possible and thus minimizing the cognitive effort necessary to utilize visual clues intended to help a user locate new information on a page.

2. Displayed Information Vs. Effectively Processed Information

Figure 4C:

Information that overlaps from a previous view is not always "old", that is, effectively processed by a user. A user, for instance, may not be able to effectively process that information because the time during which that information is displayed on the screen is too short. The difference between displayed information and processed information is illustrated in FIG. 4. If a user reads all text in a window and then uses a scroll wheel to scroll the window ten lines down to display a new portion of text 40 (FIG. 4A), and immediately after that scrolls the text five lines up, then the new lines displayed in the scrolled window will be five lines 45 at the bottom of the page (FIG. 4C). However, if a text is considered "old" just because it was displayed immediately before scrolling, then five lines 43 at the top of the page (FIG. 4C) should be considered new, which would obviously be wrong. Therefore, information displayed before scrolling should not be automatically categorized as "old". In some of the preferred embodiments described below a time limit is introduced for considering information "old". Information is considered "old", that is, effectively processed by a user (thereafter, "processed information"), if and only if the time during which it had been displayed in a window before scrolling exceeds a predetermined amount of time.

3. Defining an Attention Area

A user does not necessarily read information from the top to the bottom of a window and then scroll to a next portion. A user may, for instance, read a text from the top of a page to the middle of the page and then scroll several lines up. In other words, a user can focus his or her attention on a specific area of a window (thereafter, "effective area") instead of a window as a whole and scroll the window to cause new information enter the effective area, when necessary. This style of viewing information is especially supported by the use of scroll wheels, for instance, placed on a computer mouse. The present invention provides a system and method for a dynamic control of visual clues during scrolling based on a usage of a scroll wheel by means of allowing the user to define an area of a window for applying said visual clues. The method and system are illustrated below in the context of the second embodiment of the invention.

4. Customization

The method and system of the present invention further allow for customization. A user can set parameters relevant to the use of visual clues, such as making the visual clues enabled or disabled, selecting the type of visual clues he or she prefers, the intensity of visual clues (for example, the difference between an old and a new information in a certain visual attribute) the time during which the clues are displayed in a window, and the like. The parameters can be set in a special setting mode or during the use of scrolling windows.

Main principles of the invention are illustrated and made concrete below via a description of five preferred embodiments.

DETAILED DESCRIPTION OF PREFERRED EMBODIMENTS

1. The First Preferred Embodiment

Visual De-Emphasis of Processed Information

Figure 1A:
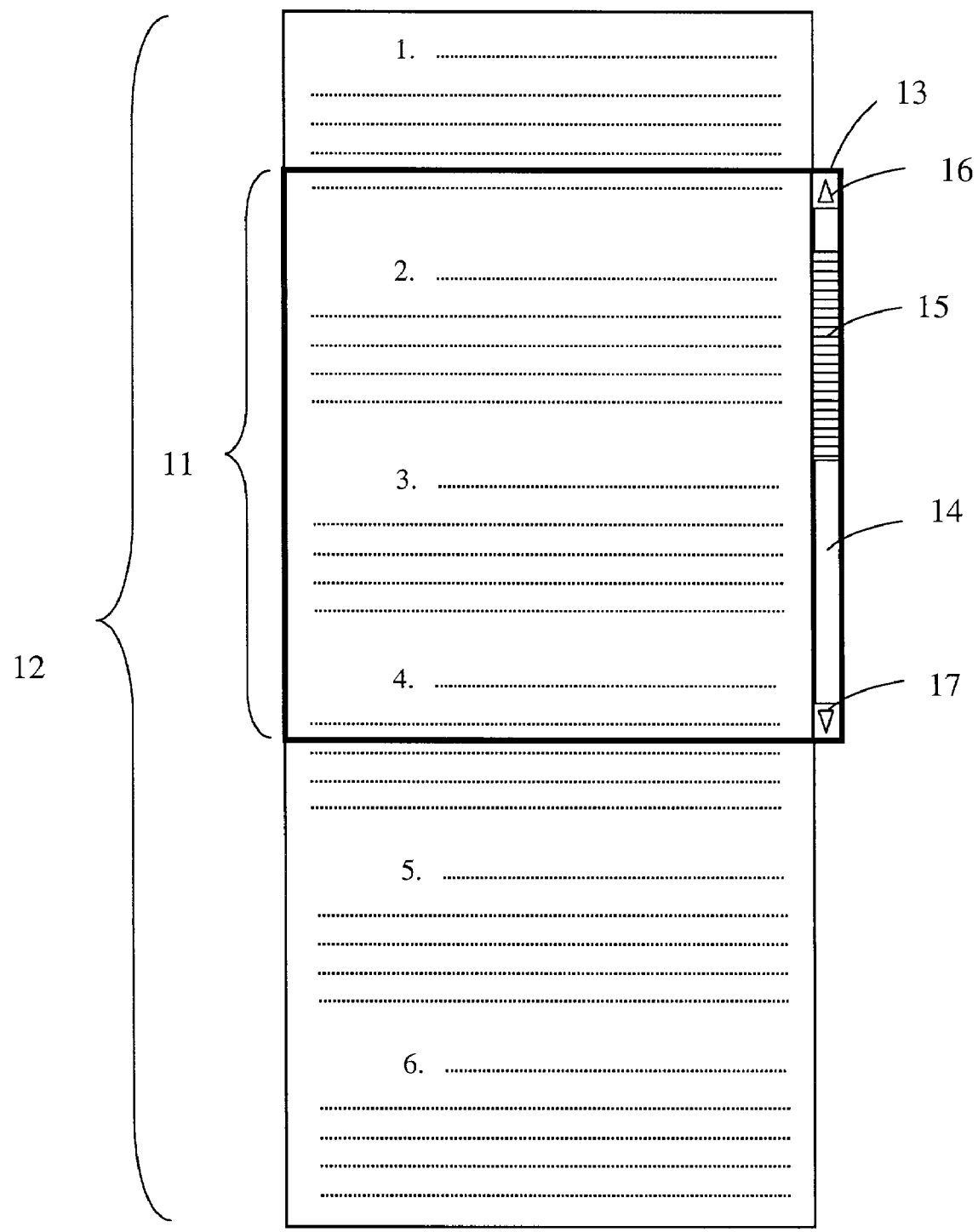
FIG. 1A and FIG. 1B are diagrams depicting a window including a conventional scroll bar scrolling through a text.
Figure 1B:
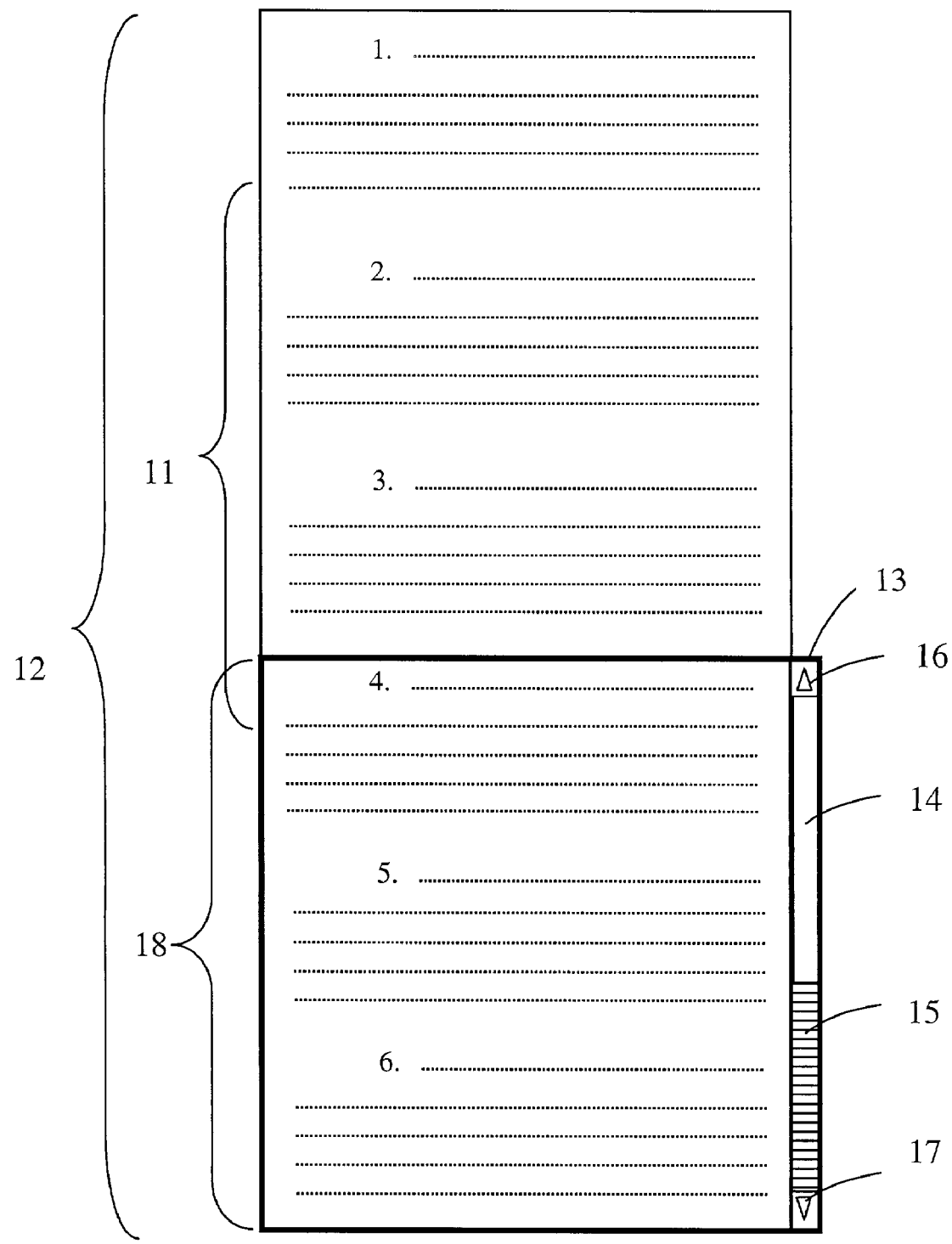
Figure 2:
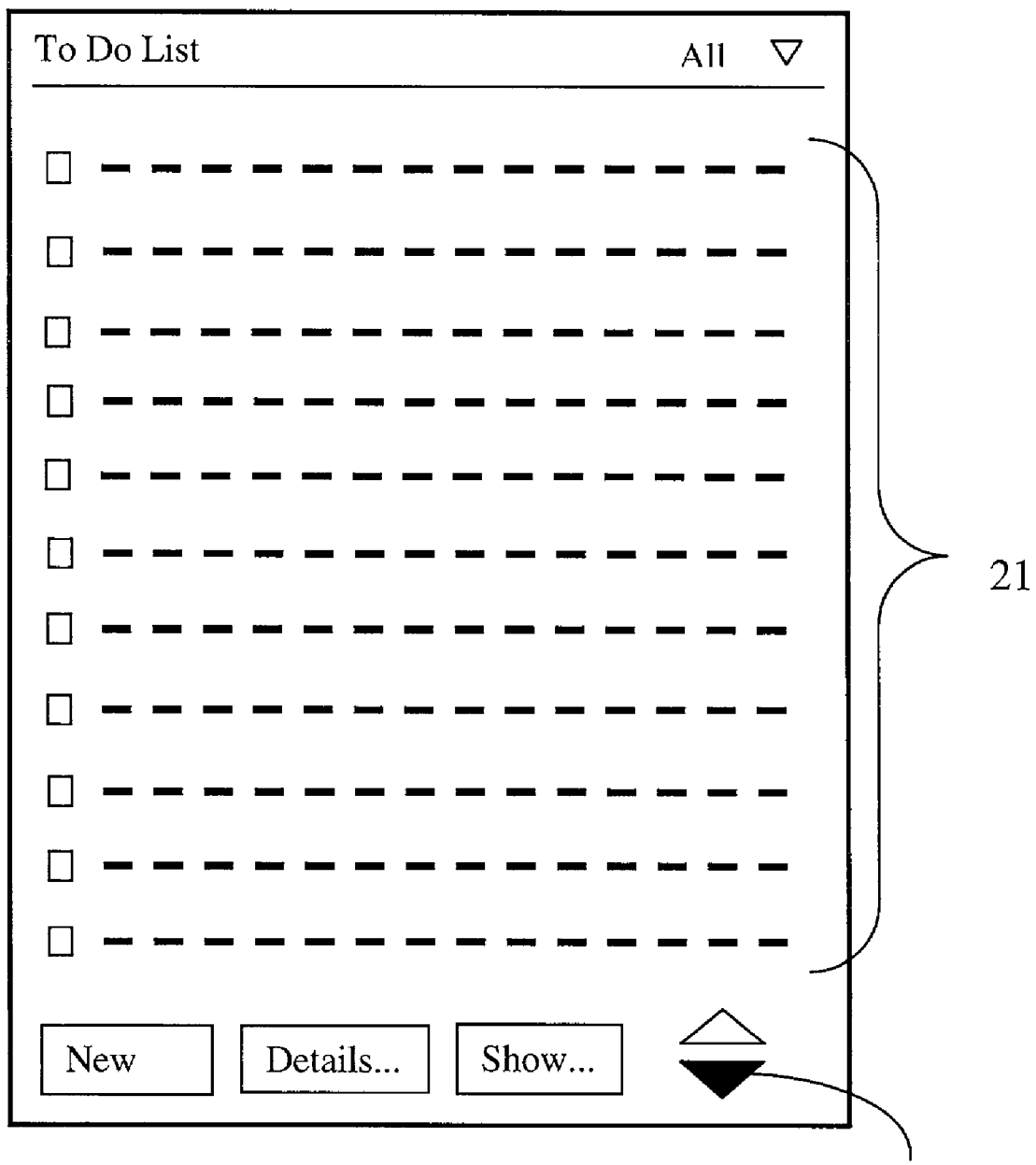
FIG. 2 is a diagram depicting a screen window including a triangle-shaped screen control for scrolling.
Figures 1, 5:
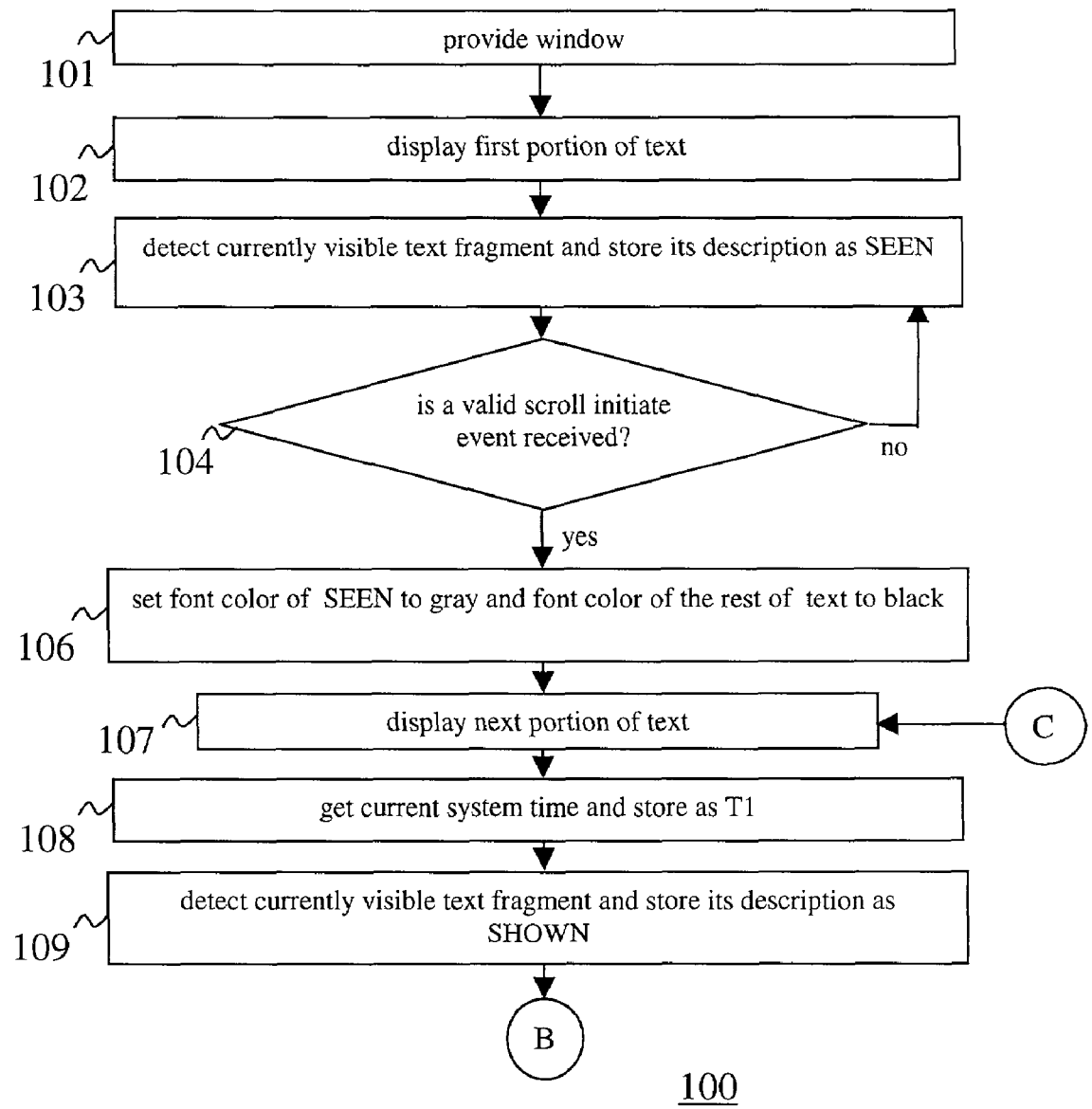
Figures 2, 5:
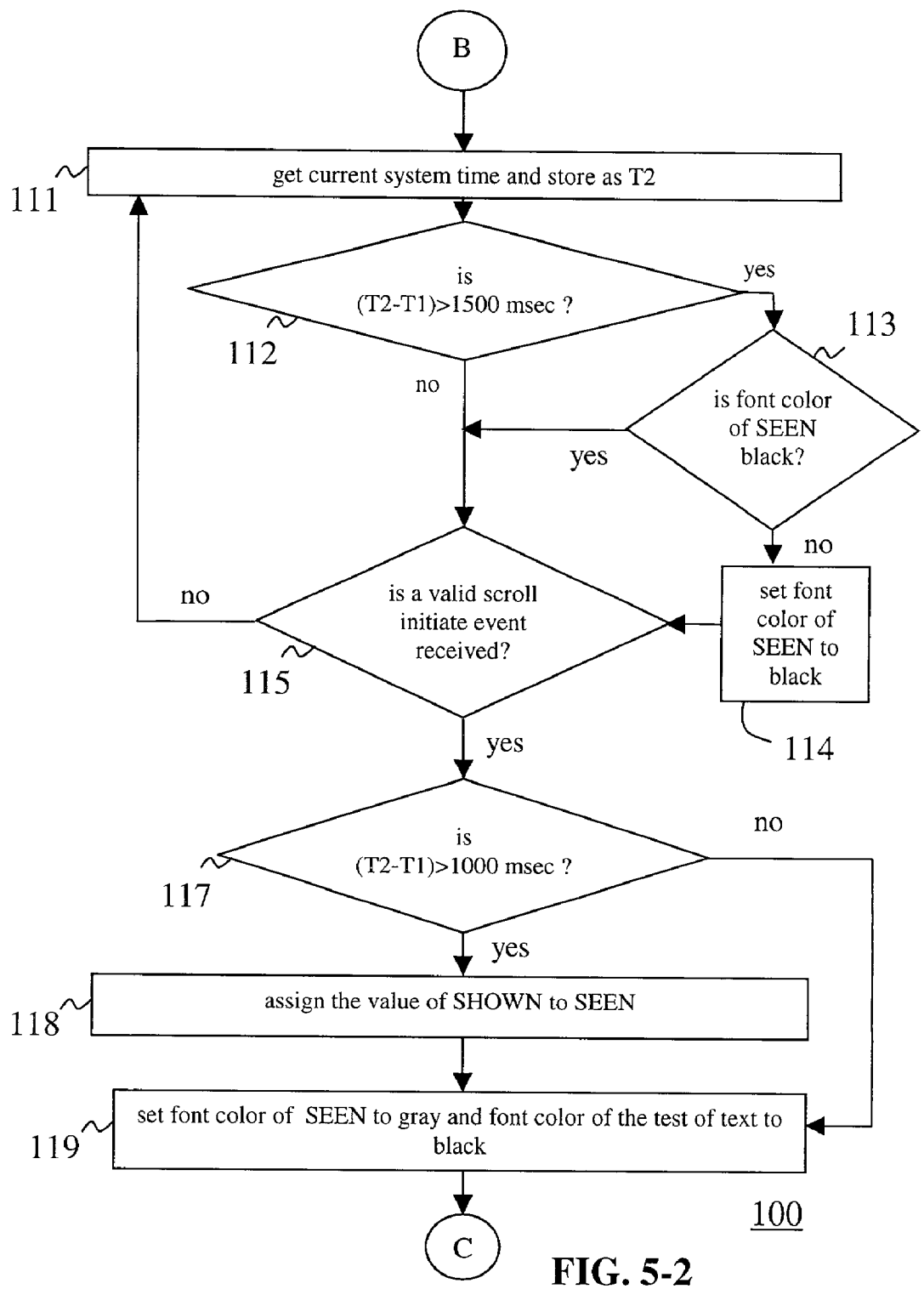

FIGS. 5-1 and FIGS. 5-2 depict a high level flow chart of a method 100 for aiding a user in viewing information displayed in a window in accordance with the first preferred embodiment. At step 101 a window for displaying information is provided. For example, a window in a word processor may be opened to display a text as black characters on a white background. If a text is too long to be displayed in one window, a first portion of the document is displayed in the window at step 102.

At step 103 one of known methods or functions is used to determine, which portion of all information related to the window is currently visible. There are two main ways to identify a visible portion. The first one is to detect, which objects (characters, lines of text, icons, graphics, etc.) are currently displayed in the window. For instance, a function CharFromPos of a Visual Basic control vbalRichEdit (freely available from) can be used. The function allows converting screen coordinates of a character, in pixels, into an index indicating the sequential order of the character in a text as a whole. By using positions of the first character and the last character of the text fragment visible in a window (the top left area of the window and the bottom right area of the window, respectively) the range of visible characters can be easily established.

The second main way to determine, which portion of information is currently visible in a window, is to establish the coordinates of the visible area within the "virtual window image" that exists in computer memory as a description of an image, which would display the whole content of the window if the window's size were unlimited. For instance, Microsoft Windows provides functions, such as GetConsoleScreenBufferInfo, to determine the currently visible area of a screen buffer. Other ways to determine, which portion of entire information related to a window is currently visible in the window can be easily recognized by those skilled in the art.

A description of the text fragment currently visible in the window (such as indexes describing the positions of the first and the last visible characters in the text or coordinates of the visible area defining its position within the screen buffer) is stored in memory at step 103 as a variable, record, and the like, named SEEN (thereafter, variable SEEN). This particular name of the variable, as well as other variable names used in this description, is chosen arbitrarily for the purpose of illustration.

At step 104 the system detects if there is any valid scroll initiate event, such as pressing PageDn keys when the window is active and can scroll down. Detecting valid scroll initiate events does not prevent the system from responding to other inputs from the user in other ways, not described in method 100. If there is a valid scroll initiate event, at step 106 the font color of text fragment defined by variable SEEN is set to gray, and the font color of the rest of text is set to black. At step 107 the window scrolls to a next portion of the text. If the window displays text that is an overlap from the previous view, overlapping text will have gray font color as opposed to black font color of newly displayed text. At step 108 the current system time is detected and stored in variable T1. At step 109 the currently visible text fragment text is detected (in a way similar to the one employed at step 103) and its description is stored in a variable SHOWN.

Current system time is detected and stored as T2 at step 111. At step 112 it is checked whether the portion of the text displayed in step 107 has been displayed for more then 1500 millisecond. Of course, another amount of time will also be in accordance with the present invention. If the portion displayed in step 107 has been displayed for less then 1500 milliseconds, it is detected if a valid scroll initiate event is received, via step 115. If the portion displayed in step 107 has been displayed for more then 1500 milliseconds, in step 113 it is detected whether the font color of text fragment defined by variable SEEN is black. If it is not black, at step 114 the font color of text fragment is changed back to black and the control is passed to step 115. If at step 113 it is detected that the font color of text defined by variable SEEN is black, the control is passed directly to step 115. If at step 115 it is detected that no valid scroll initiate event was received, the control is passed back to step 111, otherwise the next step is 117, where it is checked whether the time interval between the scroll initiate event detected at step 115 and the previous scroll initiate event exceeds 1000 milliseconds (of course, using another time will also be within the scope of the present invention). If the interval exceeds 1000 milliseconds, the value of the variable SHOWN is assigned to the variable SEEN, via step 118. Therefore, as a result of step 118 the variable SEEN contains a description of text fragment displayed at step 107 instead of a description of text fragment displayed at step 102. At step 119 the font color of text defined by variable SEEN is set to gray and font color of the rest of text to black. Therefore, if less then a 1000 millisecond interval elapses between two valid scroll initiate events, then text displayed in gray font color after scrolling will not be the text overlapping from the previous view but the text overlapping from an earlier view. After enabling visual clues by setting the font color of text fragment defined by variable SEEN to gray, the control is passed to step 107 shown in FIGS. 5-1, at which step a new portion of the document is displayed in the window.

The method 100 is described above at a high level; it does not include many details, which are not directly relevant to the subject matter of the present invention. Besides, essentially the same or analogous methods can be represented or implemented by using a different notation without employing a flow chart (for instance, by applying an object-oriented framework). These aspects are obvious to those skilled in the art and are covered by the invention. Finally, executing the method 100 (as well as other methods disclosed in the present invention) does not prevent a system or a user from executing other methods before, after, or during the execution of the method 100.

FIG. 6 depicts a window 130 in accordance with the method 100. FIG. 6A depicts the window 130 during the step 102 of the method 100. The window 130 displays a portion 131 of a document, a black text on a white background (lines of the text are shown schematically as digits and broken lines). An area 132 of the window 130 displays the last lines of the portion 131, which lines are repeated in the window 130 after it is scrolled down by a large increment. FIG. 6B depicts the window 130 during the step 107. A new portion 133 is displayed in the window 130. An area 134 of the window 130 displays a text fragment that was also displayed in the area 132 (see FIG. 6A). The font color of the text fragment displayed in the area 134 is gray, as opposed to the rest of the portion 133. FIG. 6C depicts the window 130 during the step 114 of the method 100, after the portion 133 has been displayed in the window 130 for more then 1500 milliseconds. The font color of all text displayed in window 130 is black.

2. The Second Preferred Embodiment Visual Emphasis of "New" Information and Using an Effective Area of a Window FIG. 7 (comprise 7-1, 7-2, and 7-3) depicts a high level flow chart of a method 250 in accordance with the second preferred embodiment of the present invention. The method 250 is intended to deal exclusively with vertical scrolling by using a scroll wheel. This limitation was deliberately introduced to better illustrate the underlying idea. Those skilled in the art will readily recognize that the invention can be implemented to deal with other types of scrolling. In accordance with the method 250 information is considered processed no matter how briefly it is displayed to a user. Of course, a time limit for considering information processed (as in the method 100) can be introduced. It is appreciated that the method 250 can be obviously modified so that a user or a computer system can perform other scrolling actions, including a horizontal scrolling.

At step 251 a window is provided for displaying a document containing a text. Screen coordinates of the window are detected and stored in variables LEFT, TOP, RIGHT, and BOTTOM, via step 252. At step 253 a first portion of the document is displayed. At step 254 the Y-coordinate of the mouse pointer is detected and stored in a variable HEIGHT. At step 255 it is detected whether the user uses a scroll wheel. If a scroll wheel is not used, the control is passed to step 254. If a user uses a scroll wheel, it is detected at step 256 whether the pointer is positioned at a level, which is located between the top and the bottom of the window provided at step 251. If the pointer is positioned between the top and the bottom of the window, then at step 257 the value of variable HEIGHT is assigned to variable BOTTOM_Y. If the pointer is positioned on computer screen above or below the window, then at step 258 the value of variable BOTTOM is assigned to variable BOTTOM_Y. Step 260 comprise several sub-steps: (1) detecting the index of the last line visible in the area defined by variables LEFT, RIGHT, TOP, and BOTTOM_Y, (2) storing the index in variable LAST_SHOWN, (3) adding 1 to the number stored in variable LAST_SHOWN, and (4) assigning the sum to variable MARKED_LINE.

At step 261 the window is scrolled and a new text portion is displayed. At step 262 text line having index equal to the number stored in variable MARKED_LINE is highlighted, for instance, by changing its font color from black to blue. At step 263 the current system time is detected and stored in variable T1. At step 264 the current system time is detected and stored in variable T2. At step 265 it is detected whether the displayed text fragment has been displayed for more then 1500 msec. If it has been displayed for more then 1500 msec then at steps 266 and 267 the appearance of the highlighted line is changed back to normal. At step 268 it is detected whether a user uses a scroll wheel to scroll the window, and if not, the control is passed back to step 264, otherwise control is passed to step 269. At step 269 it is detected if the displayed text fragment has been displayed for more then 1000 msec. If not, the control is passed to step 261, otherwise the control is passed to step 270. At step 270 the Y-coordinate of the pointer is detected and stored in variable HEIGHT.

At step 271 it is detected whether the pointer is positioned at a level, which is located between the top and the bottom of the window. If the pointer is positioned between the top and the bottom of the window, then at step 272 the value of variable HEIGHT is assigned to variable BOTTOM_Y. If the pointer is positioned on computer screen above or below the window, then at step 273 the value of variable BOTTOM is assigned to variable BOTTOM_Y. Step 274 comprise detecting the index of the first line visible in the area defined by variables LEFT, RIGHT, TOP, and BOTTOM_Y and storing the index in variable FIRST_SHOWN, and detecting the index of the last line visible in the area defined by variables LEFT, RIGHT, TOP, and BOTTOM_Y and storing the index in variable LAST_SHOWN. At step 275 it is detected if the window is about to scroll down. If yes, "1" is added to the number stored in variable LAST_SHOWN and the sum is stored in variable MARKED_LINE at step 276. If the window is about to scroll up then 1 is subtracted from the number stored in variable FIRST_SHOWN and the sum is stored in variable MARKED_LINE at step 277. After either step 276 or step 277 the control is passed to step 261.

FIG. 8 depicts a window 290 in accordance with the method 250. FIG. 8A depicts the window 290 during the step 253 of the method 250. The window is displaying a portion 291 of a text document. A pointer 292 is positioned at a level 293. FIG. 8B depicts the window 290 during the step 262 of the method 290, after a user has scrolled the window six lines down by rotating a scroll wheel (not depicted in FIG. 8). The pointer 292 defines an effective area 295. A text line 294 is highlighted via changing its color. FIG. 8C depicts the window 290 of the method 250 during step 267. The portion 291 has been displayed in the window 290 for more then 1500 milliseconds and the font color of all text displayed in the window 290 is black.

Figure 8A:
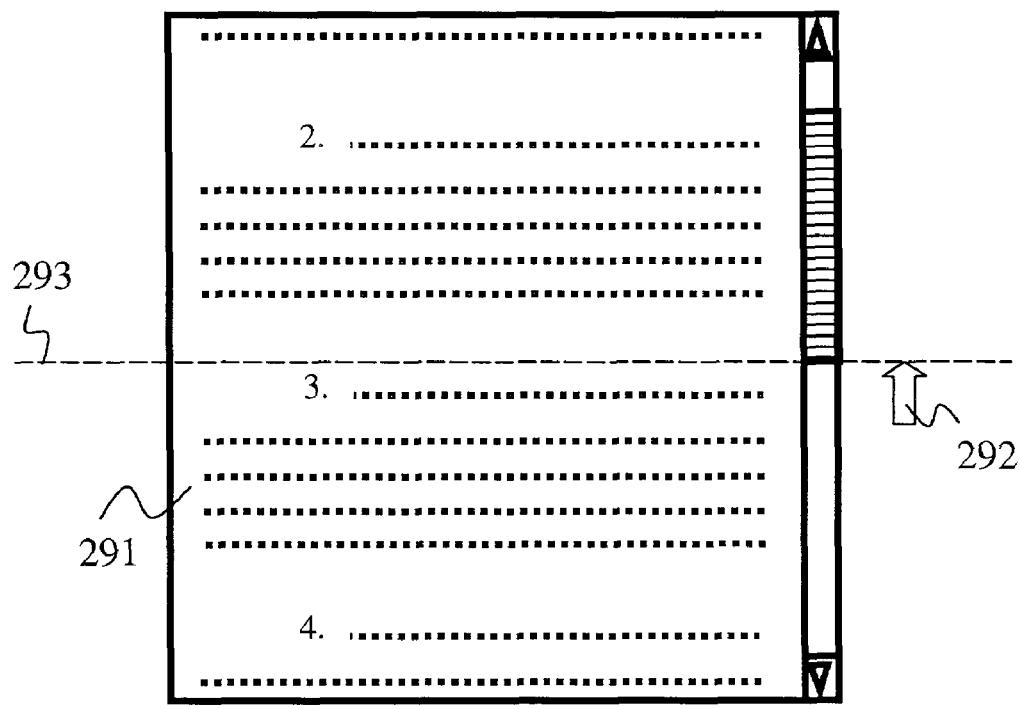
FIG. 8A, FIG. 8B, FIG. 8C, and FIG. 8D are diagrams of the computer display in accordance with the second embodiment of the present invention depicting scrolling a window through a text by means of a coordinated usage of a scroll wheel and a pointer.
Figure 8B:
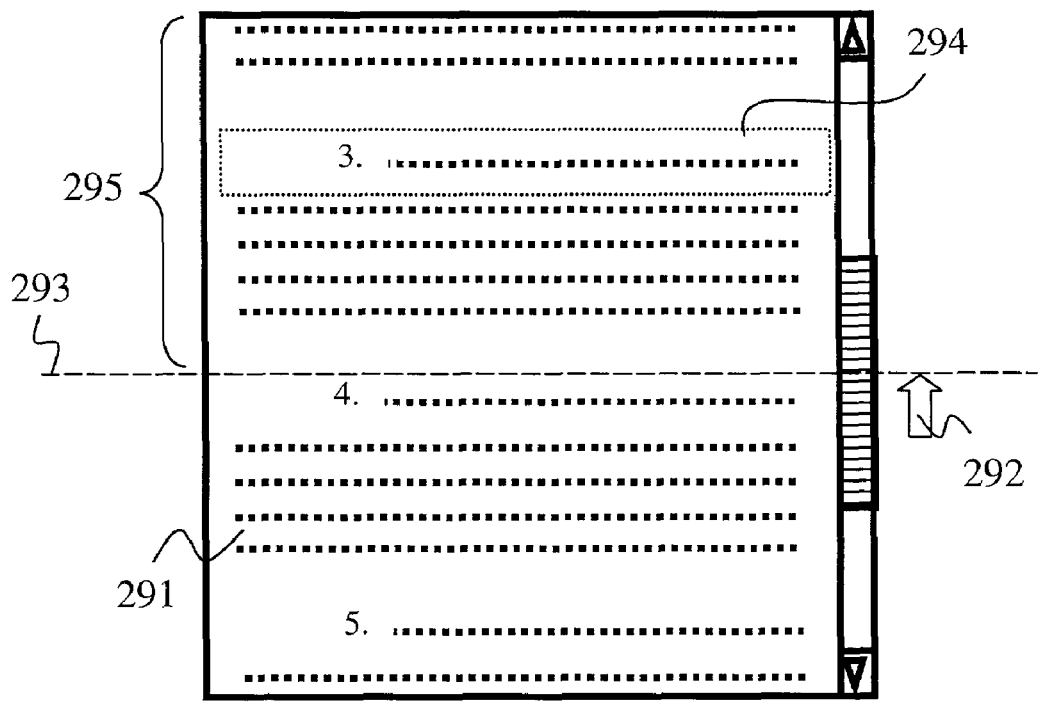
Figure 8C:
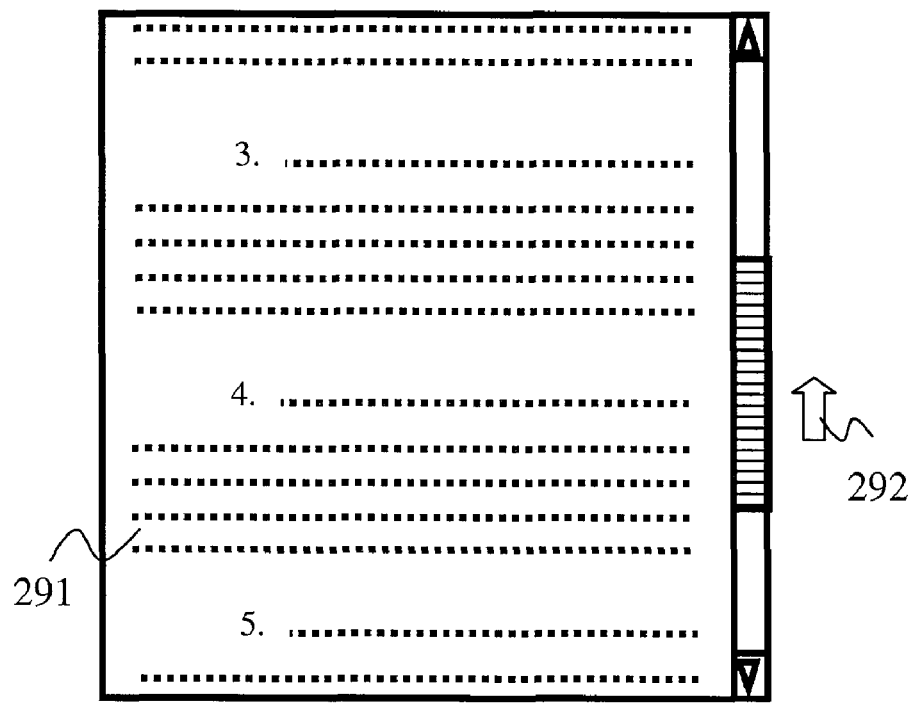
Figure 8D:
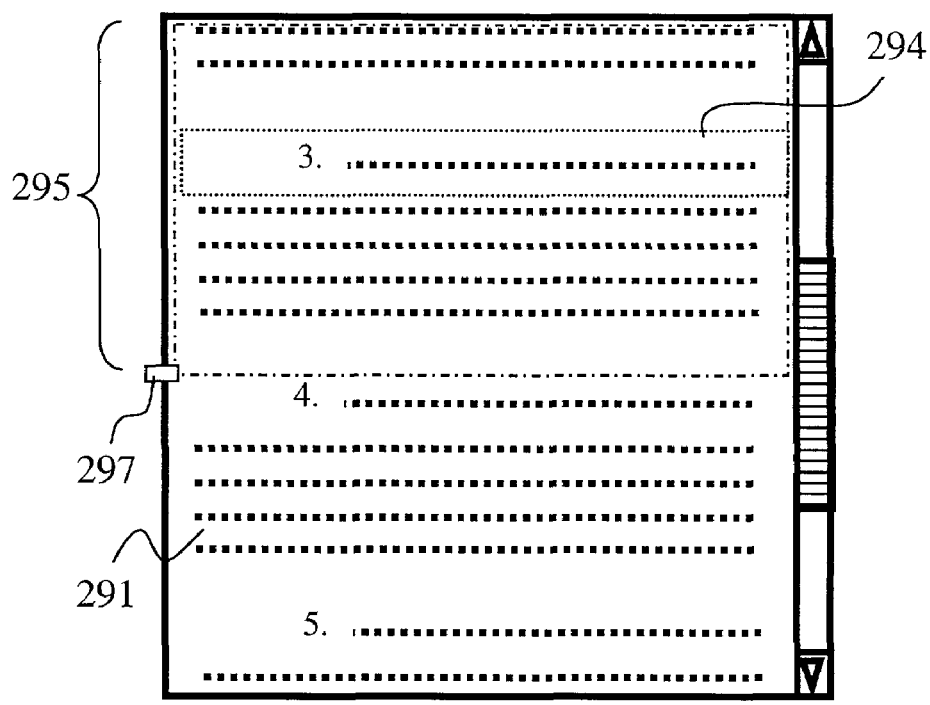

FIG. 8D depicts an alternative way for a user to define the borders of the effective area 295. It depicts a window after scrolling, when line 294 is still highlighted. Instead of controlling the borders by moving the screen cursor a user is provided with a rectangular-shaped control 297, which appears on the screen for a predetermined amount of time after scrolling or after selecting an item on a context menu. A user can set the border of the effective area 295 by dragging the control 297 up or down.

3. The Third Preferred Embodiment

Changing Background

Figures 1, 9:
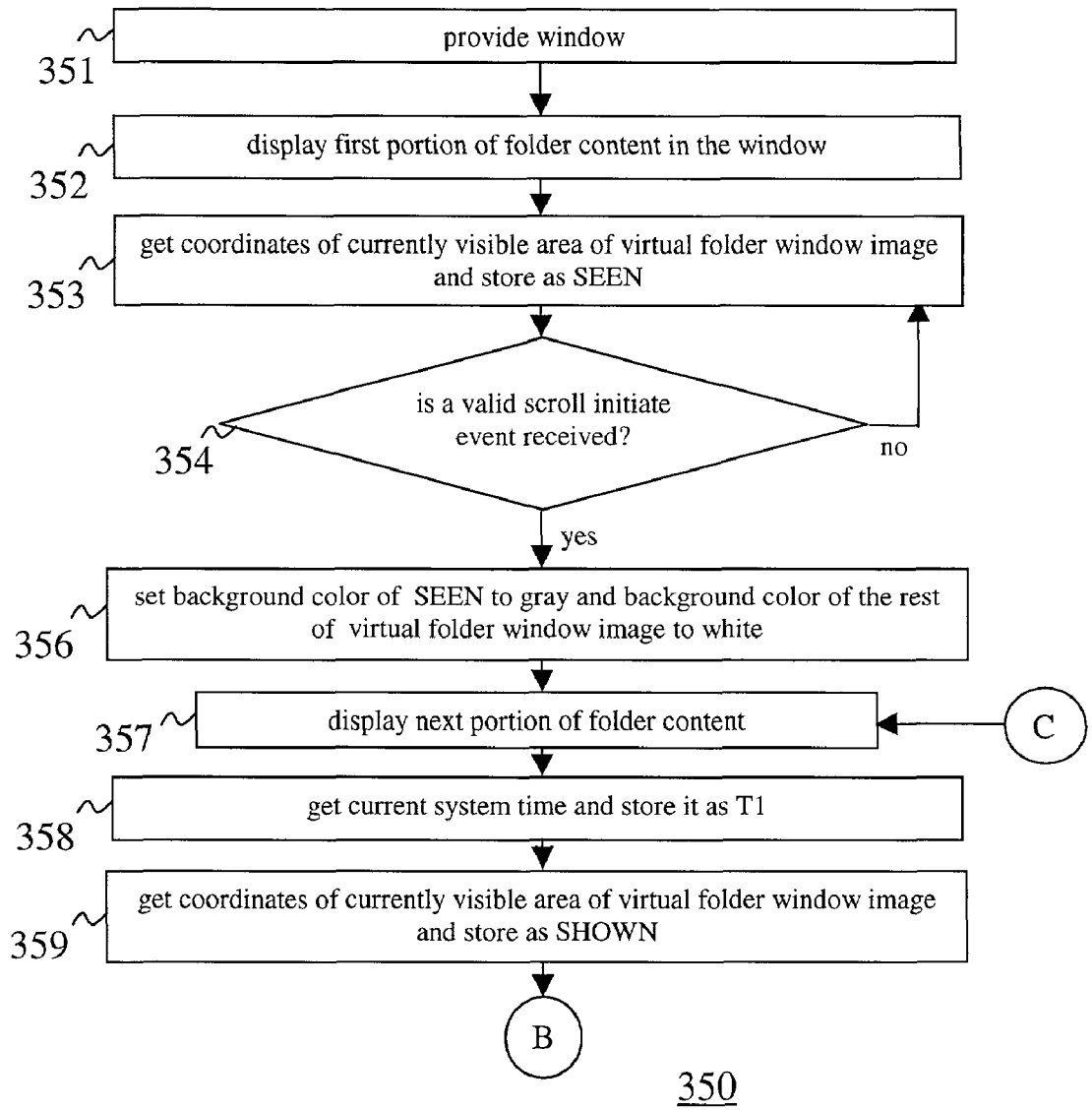
Figures 2, 9:
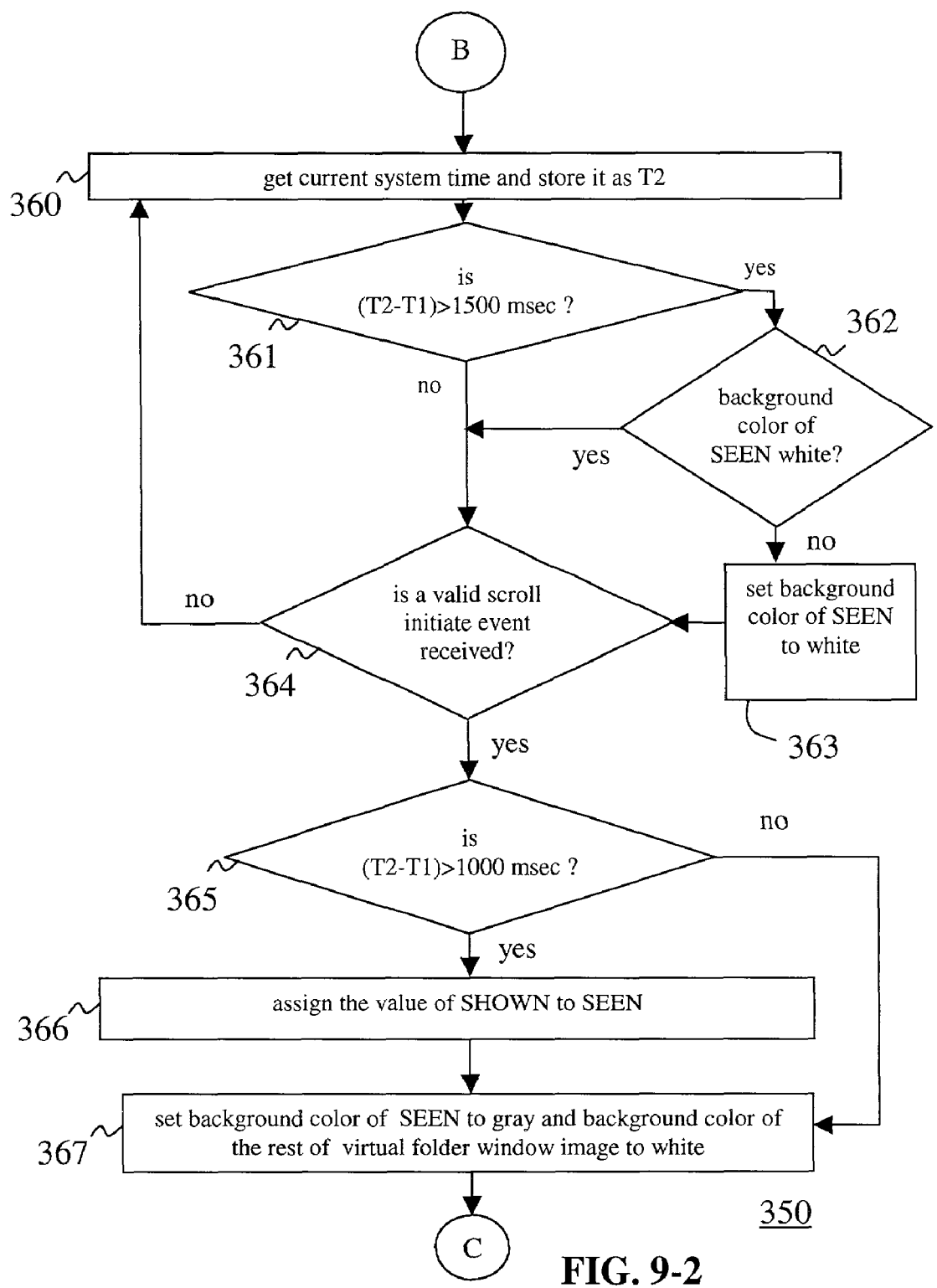

FIGS. 9-1 and FIGS. 9-2 depict a high level flow chart of a method 350 in accordance with the third preferred embodiment of the present invention. The method 350 is similar to method 100. The main difference between the method 100 and the method 350 is that the visual clue used in the method 350 is the color of the background on which textual and graphical information is displayed. In case a window after scrolling displays information that has also been displayed before scrolling, that information is displayed on a gray background instead of a white background. In accordance with the method 350: a window is provided (step 351), a portion of a folder window containing icons of files and folders, is displayed on a white background (step 352), the coordinates of the currently displayed area within the virtual window image are detected and stored in a variable SEEN (step 353), it is detected if a valid scroll initiate event is received (step 354), the background of the area defined by the variable SEEN is set to gray (356), a new portion of the content is displayed in the window (step 357), current time is stored in a variable T1 (step 358), the coordinates of the currently displayed area within the virtual window image are detected and stored in a variable SHOWN (step 359), current time is stored in a variable T2 (step 360), if the portion of the content displayed in step 357 has been displayed for over 1500 milliseconds the visual clues are disabled (steps 361, 362, and 363), it is detected if a valid scroll initiating event is received (step 364) and if not then control is passed back to step 360, it is checked whether the time interval between the current scrolling and the previous scrolling is less then 1000 milliseconds, and if it is less then 1000 milliseconds then the background color is set to gray for the area defined by the variable SEEN (after assigning its value to variable SHOWN), otherwise the background color is set to gray for an area defined by the variable SHOWN (steps 365, 366, and 367). After that the control is passed to step 357, where a new portion of the content is displayed in the window.

Figure 10A:
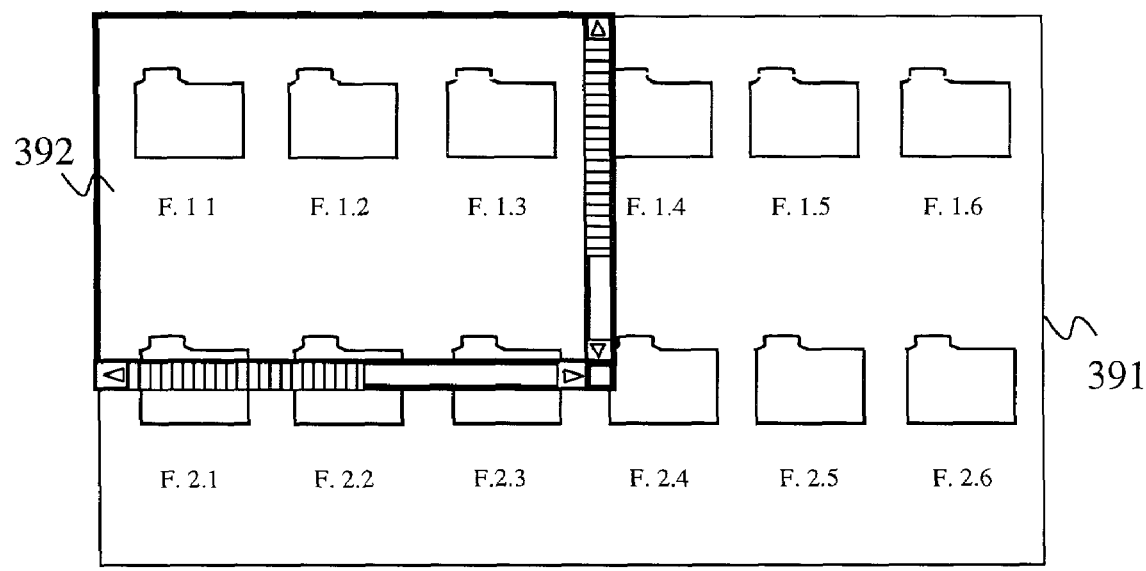
FIG. 10A, FIG. 10B, and FIG. 10C are diagrams of the computer display in accordance with the third embodiment of the present invention depicting horizontal scrolling of a window through rows of icons with icons displayed before scrolling that are also displayed after scrolling temporarily shown on a gray background.
Figure 10B:
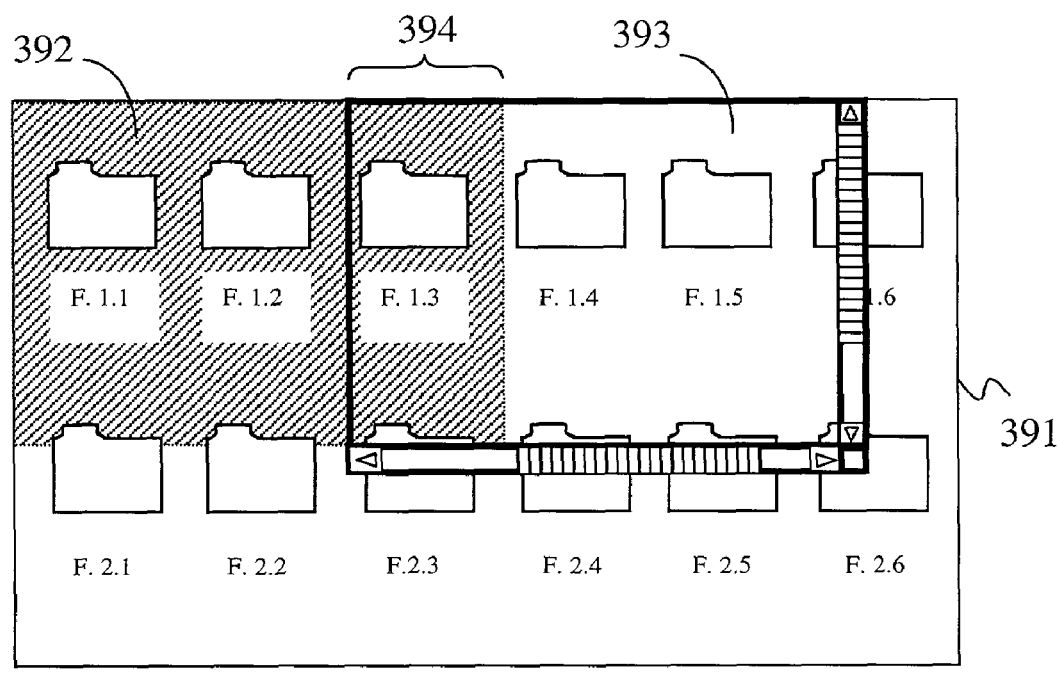
Figure 10C:
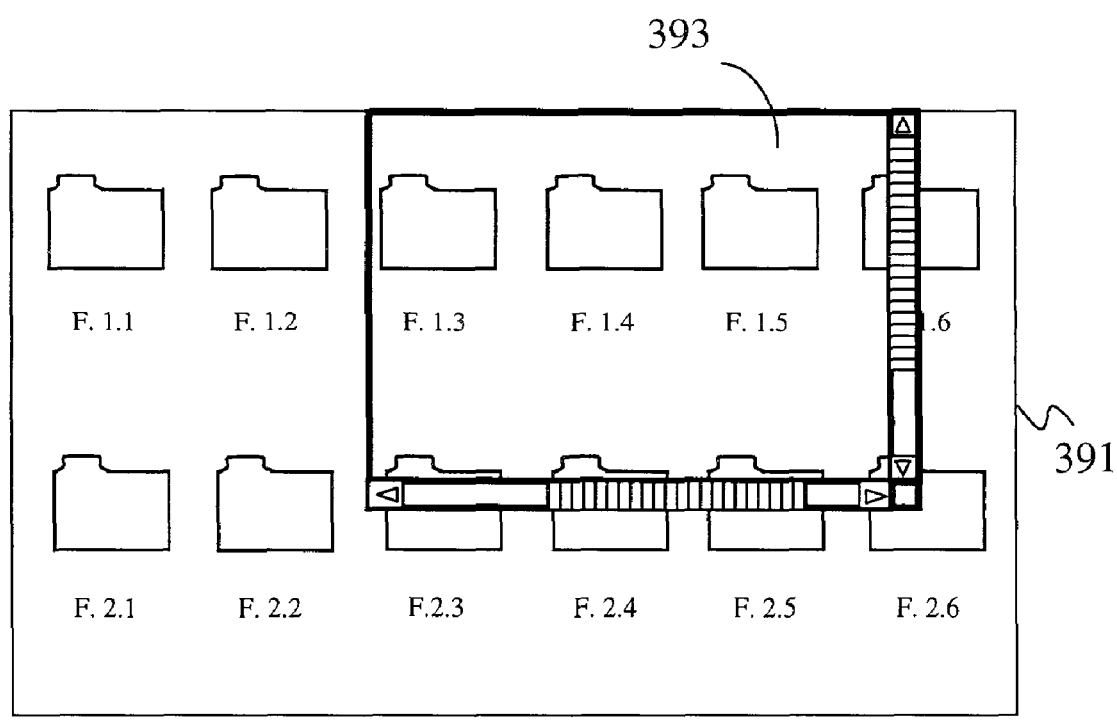

FIG. 10 depicts a window 390 in accordance with the method 350. FIG. 10A depicts the window 390 during the step 352 of the method 350. It shows a virtual window image 391 displaying the whole content of the window 390. The virtual window image is stored in memory and only a portion 392 of the virtual window image 391 is displayed in the window 390. FIG. 10B depicts the window 390 during the step 357 of the method 350. A new portion 393 is displayed in the window 390. An area 394 of the window 390 that belongs to both the portion 392 and the portion 393 is displayed on a gray background. FIG. 10C depicts the window 390 during the step 363 of the method 350, after the portion 393 has been displayed in the window 390 for more then 1500 milliseconds. The background color of the whole image displayed in the window 390 is white.

The use of changing background in accordance with the third preferred embodiment is especially useful when the area of scrolled window that overlaps from the previous view does not contain foreground objects. In such cases the second preferred embodiment could be used as a compliment to other possible embodiments.

4. The Fourth Preferred Embodiment

Dynamic Borders

Figures 1, 11:
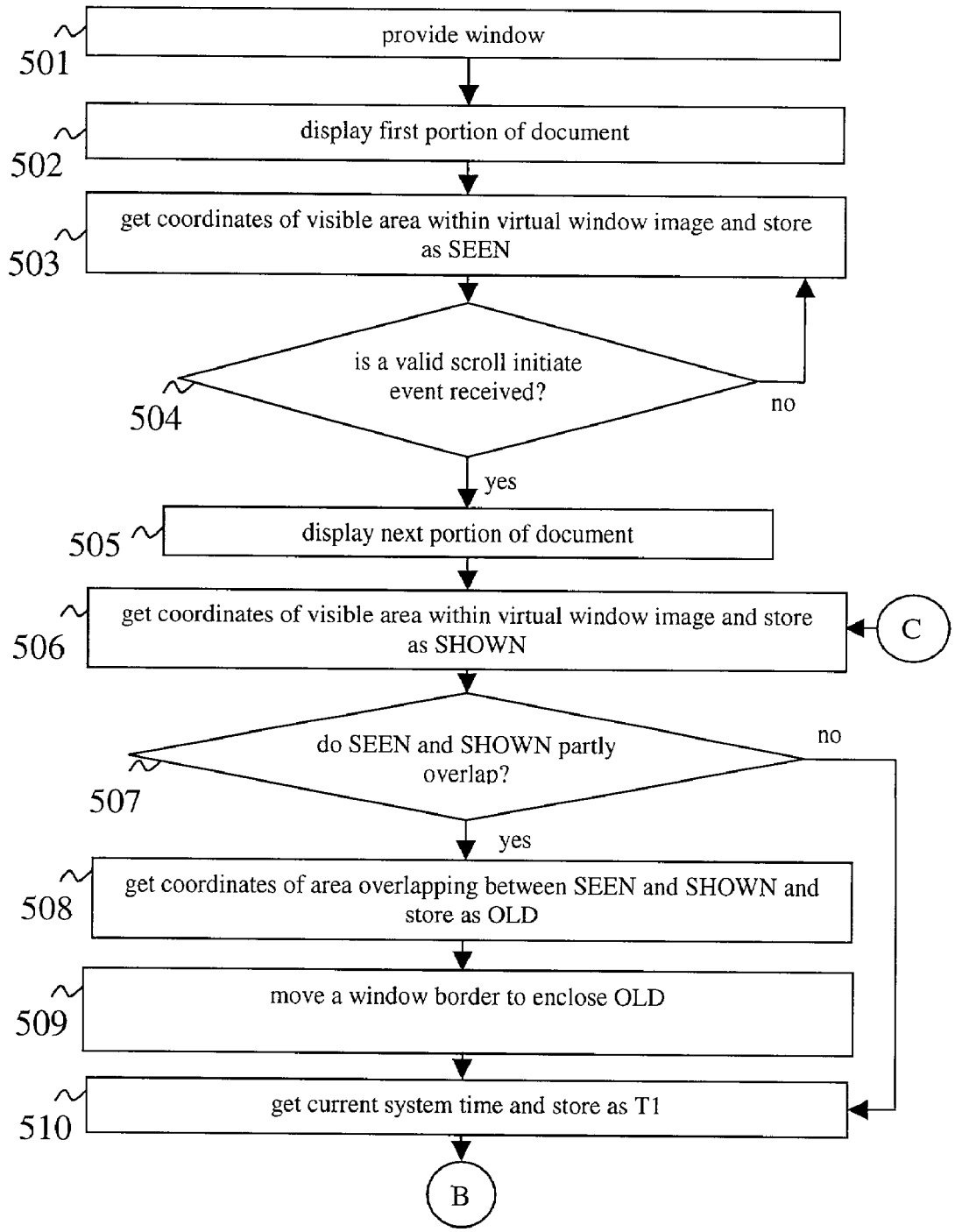
Figures 2, 11:
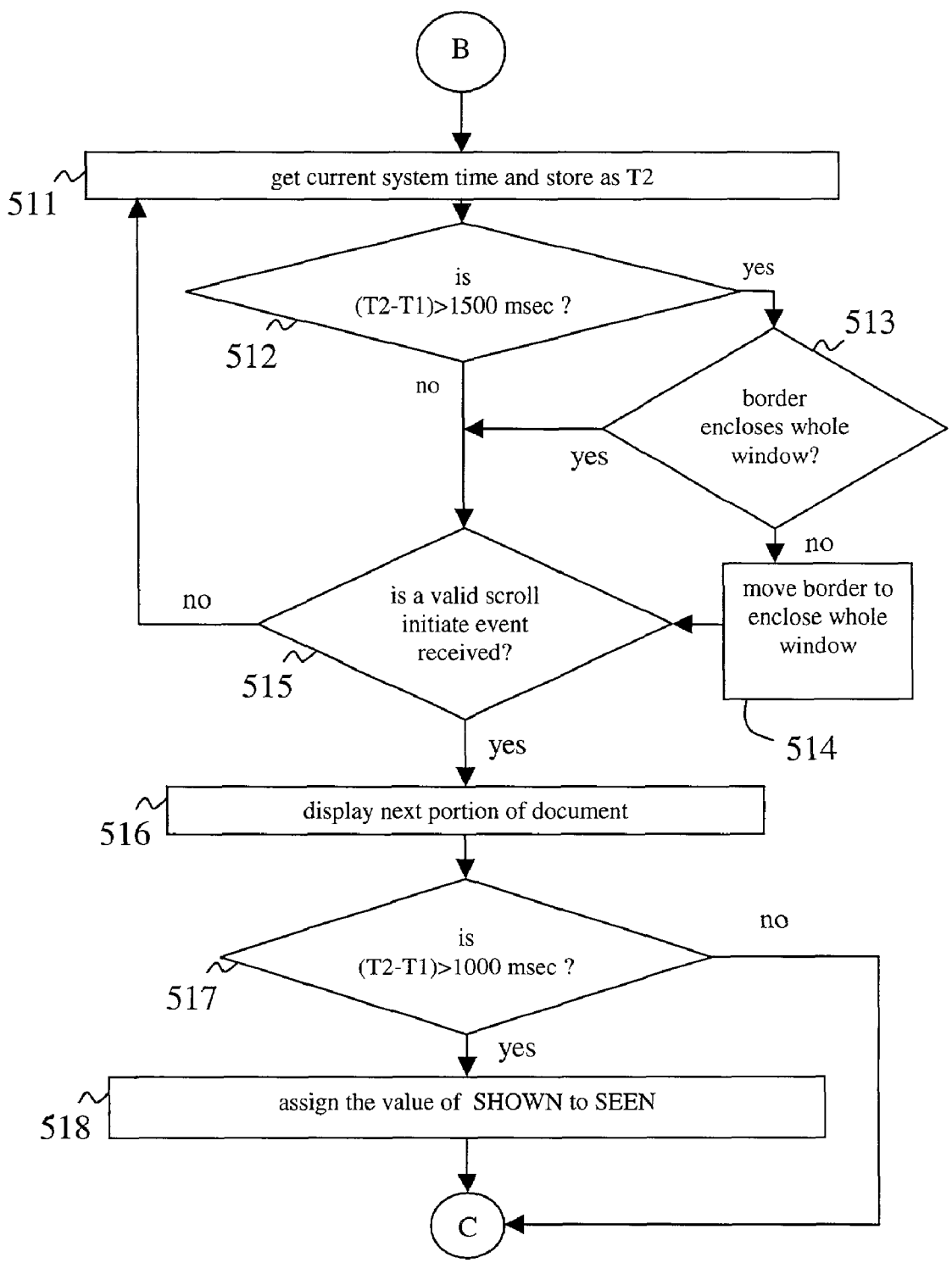

FIGS. 11-1 and FIGS. 11-2 depict a high level flow chart of a method 500 for aiding a user in viewing information displayed in a window in accordance with the fourth preferred embodiment. The method 500 is similar to the method 100. The main difference is that in accordance with the method 500 processed information and not processed information are separated by a moving, dynamic border of the window. At step 501 shown in FIGS. 11-1 a window for displaying information is provided. A first portion of a document is displayed at step 502. In step 503 the coordinates of a visible area within the virtual window image are detected and stored in memory as a variable SEEN.

In step 504 it is detected if a valid scroll initiate event is received. If not, the control is passed back to step 503. At step 505 the window scrolls to a next portion. At step 506 the coordinates of the visible area within the virtual window image are detected and stored in memory as a variable SHOWN. The values of the variable SEEN and the variable SHOWN are compared at step 507. If they are identical (that is, the text shown after scrolling is exactly the same text as was shown before scrolling) or do not overlap, then the control is passed directly to step 510. If the values of variables SEEN and SHOWN are not identical and partly overlap, at step 508 the coordinates of the area displaying the overlapping of SHOWN and SEEN are detected and stored in variable OLD. At step 509 window border is moved so that the border encloses the area of window, defined by variable OLD. At step 510 the current system time is detected and stored in variable T1.

The method is further depicted in FIGS. 11-2. The current system time is detected and stored as T2 at step 511. At step 512 it is detected whether the portion of the text displayed in step 505 has been displayed for more then 1500 milliseconds. If the portion displayed in step 505 has been displayed for more then 1500 milliseconds, the borders enclosing old contents are moved so that they correspond to the normal borders of the window (steps 513 and 514). After that the control is passed to step 515. At step 515 it is detected if a valid scroll initiate event is received. If there is no scroll initiate event, the control is passed back to step 511, otherwise the control is passed to step 516. At step 516 the window is scrolled to a new portion of information. At step 517 it is detected whether the time interval between the scroll initiate event detected at step 515 and the previous scroll initiate event detected at step 504 exceeds 1000 milliseconds. If the interval exceeds 1000 milliseconds, the value of the variable SHOWN is assigned to the variable SEEN, via step 518 and control is passed to step 506 shown in FIGS. 11-1. If the interval does not exceed 1000 milliseconds, then control is directly passed to step 506.

FIG. 12 depicts a window 550 in accordance with the method 500. FIG. 12A depicts the window 550 during the step 502 of the method 500. The text displayed in the window 550 is enclosed by an internal border 552. FIG. 12B depicts the window 550 during step 509 of the method 500, after the window 550 is scrolled by clicking on a scroll shaft below a scroll box 553. The border 552 is enclosing an area 555 of the window 550. The area 555 displays information overlapping from the previous view, depicted in FIG. 12A. FIG. 12C depicts the window 550 during the step 514 of the method 500, after more then 1500 milliseconds from previous scrolling. The border 552 encloses the whole content displayed in the window 550.

Figure 12A:
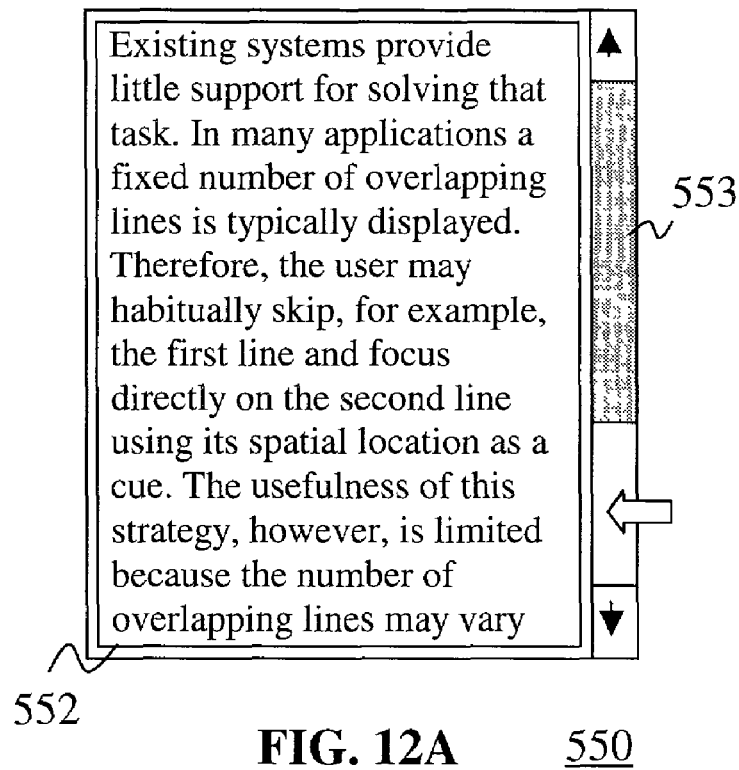
FIG. 12A, FIG. 12B, FIG. 12C, and FIG. 12D are diagrams of the computer display in accordance with the fourth embodiment of the present invention depicting the use of a dynamic border during vertical scrolling of a window through a text.
Figure 12B:
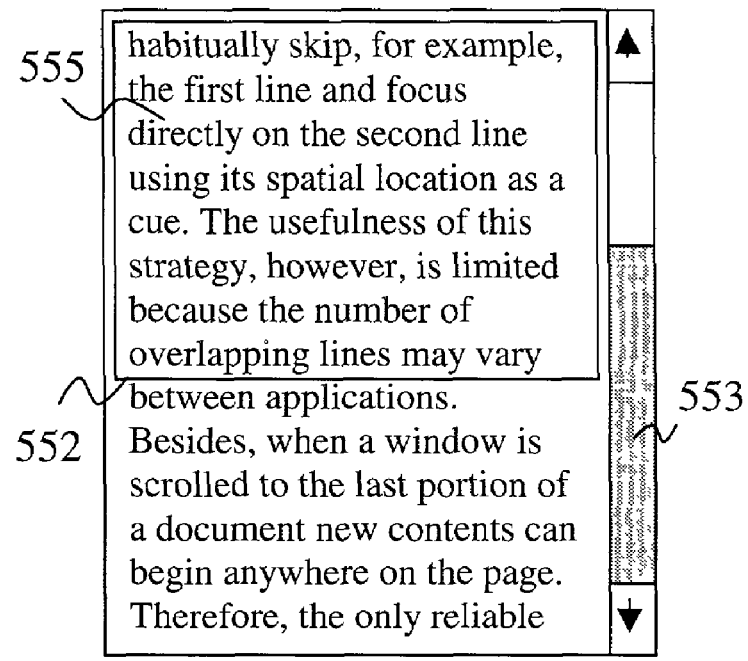
Figure 12C:
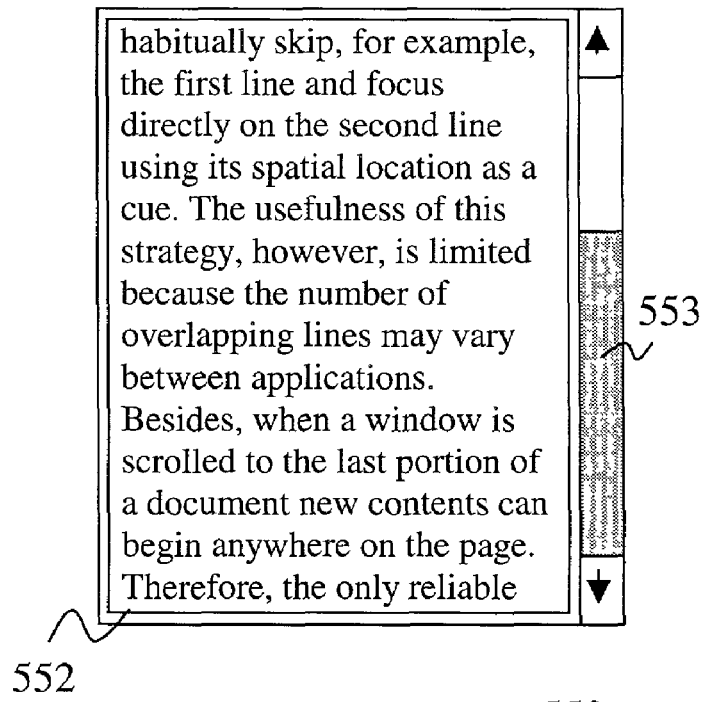
Figure 12D:
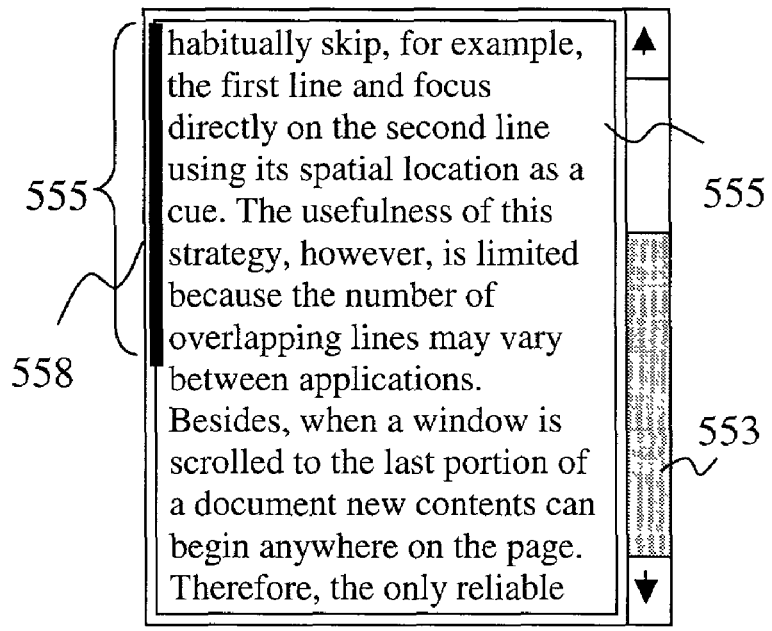

FIG. 12D depicts another example of a temporary visual clue implemented as a part of dynamic border. Immediately after scrolling of the view depicted in FIG. 12A only one side of the border enclosing the area 555 is made visually distinct to help the user skip processed information and focus directly on not processed information. More specifically, a line section 558, composing the left border of the area 555 is highlighted by making it slightly thicker then the rest of the border of the window 550.

5. The Fifth Preferred Embodiment

Marginal Markers

Figures 1, 13:
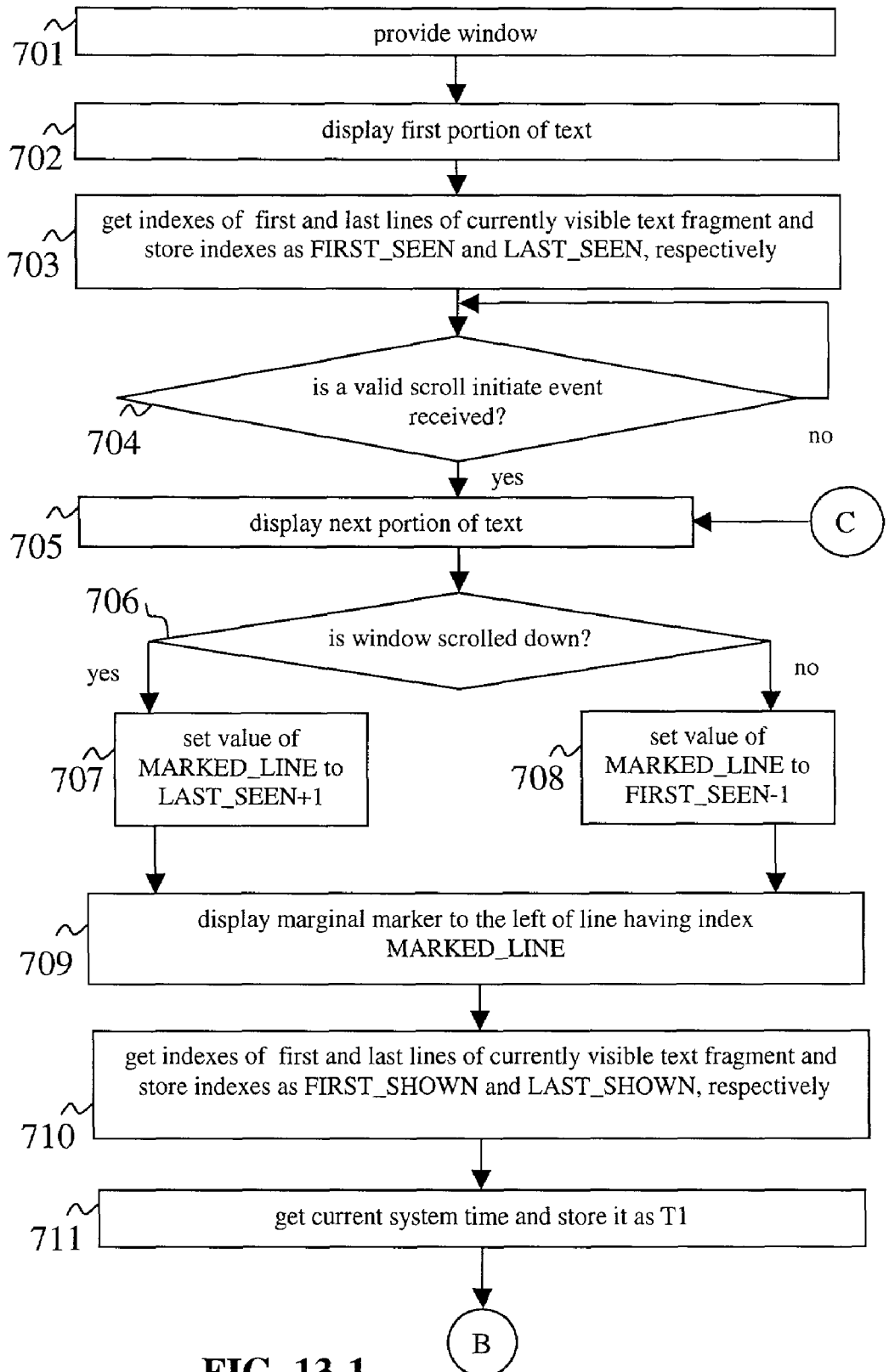
Figures 2, 13:
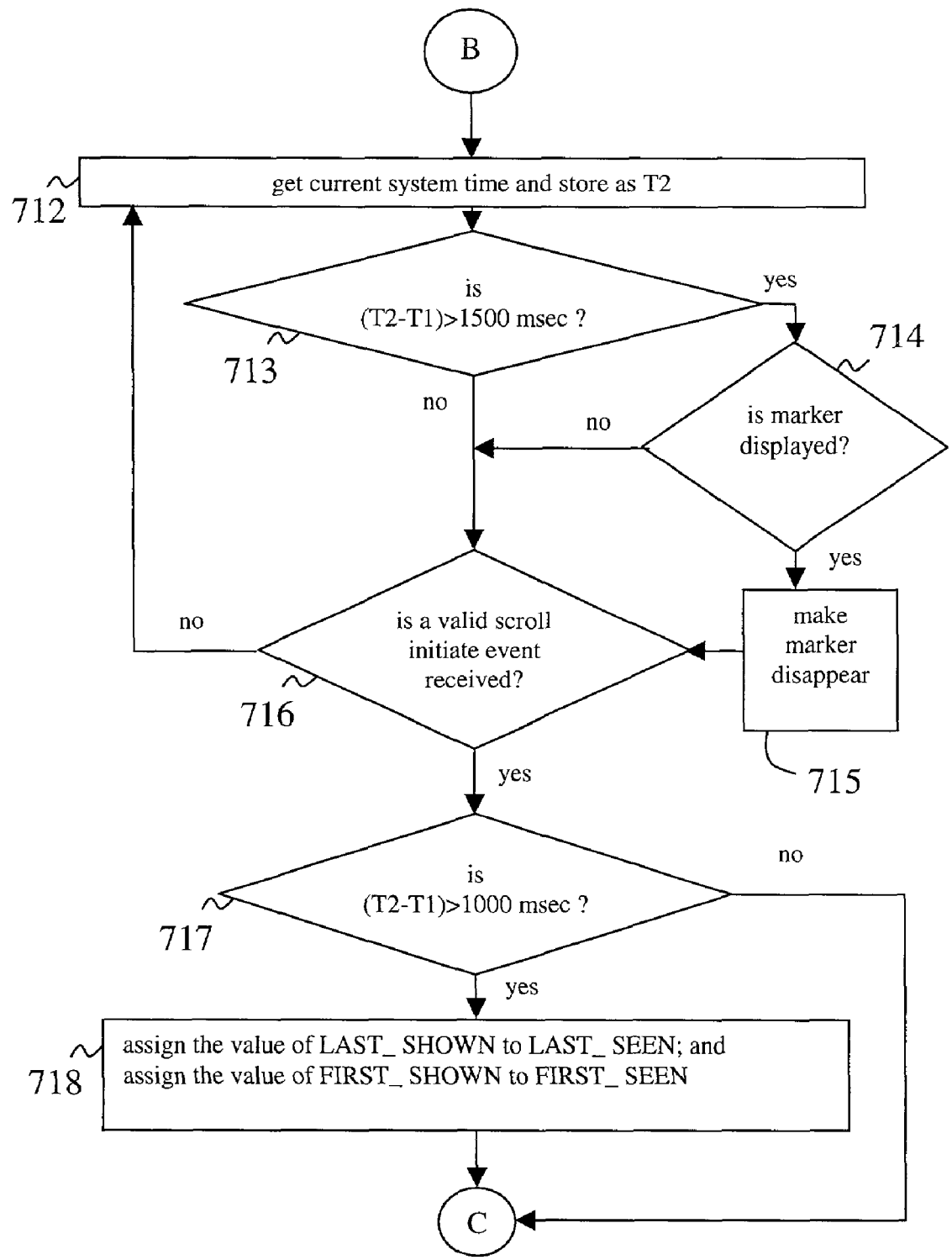

FIGS. 13-1 and FIGS. 13-2 depict a high level flow chart of a method 700 in accordance with the fifth preferred embodiment. In step 701 shown in FIGS. 13-1 a window for displaying information is provided. A first portion of the document is displayed at step 702.

At step 703 indexes of the first and the last lines of text fragment visible in the window are detected. These indexes indicate the positions of the lines in the text as a whole. The indexes are stored, respectively, in variables FIRST_SEEN and LAST_SEEN. At step 704 it is detected whether a valid scroll initiate event is received. It there is a valid scroll initiate event, then at step 705 the window scrolls to the next portion of the text. At step 706 it is detected whether the window is scrolled down. If it is scrolled down, then at step 707 the value of variable MARKED_LINE is set to LAST_SEEN+1, otherwise at step 708 the value of MARKED_LINE is set to FIRST_SEEN−1. At step 709 a marginal marker is displayed to mark the line having index equal to the number stored in variable MARKED_LINE. At step 711 the current system time is detected and stored in variable T1. At step 712 the current system time is detected and stored in variable T2.

At step 713 it is detected whether the portion of the text displayed in step 705 has been displayed for more then 1500 millisecond. If it has been displayed for more then 1500 milliseconds, at steps 714 and 715 the marginal marker is disabled. At step 716 it is detected whether a valid scroll initiate event is received. If there is no scroll initiate event, the control is passed back to step 712, otherwise the control is passed to step 717. At step 717 it is checked whether the time interval between the scroll initiate event detected in step 716 and the previous event exceeds 1000 milliseconds. If the interval exceeds 1000 milliseconds, the value of the variable LAST_SHOWN is assigned to the variable LAST_SEEN and the value of the variable FIRST_SHOWN is assigned to the variable FIRST_SEEN via step 718. After that the control is passed to step 705.

Figure 14A:
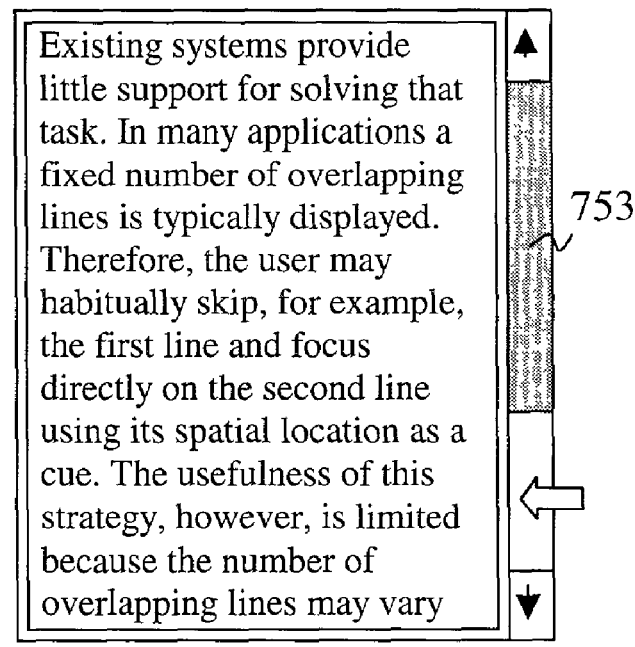
Figure 14B:
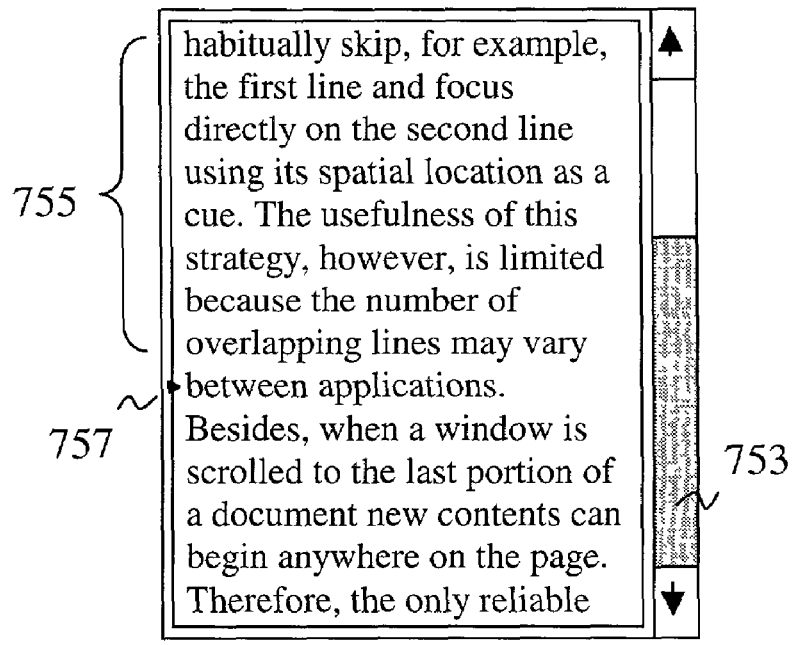

FIG. 14 depicts a window 750 in accordance with the method 700. FIG. 14A depicts the window 750 during the step 702 of the method 700. The window 750 displays a fragment of black text on a white background (lines of the text are shown schematically as broken lines). FIG. 14B depicts the window 750 during the step 709, after it was scrolled by clicking on a scroll shaft below a scroll box 753. A text fragment 755 displayed in the window 750 overlaps from the previous view shown in FIG. 14A. The first line of text immediately following the text fragment 755 is marked by a rectangle-shaped small-size marker located on the left margin. FIG. 14C depicts the window 750 during the step 715 of the method 700. The marginal marker is disabled, it is no longer displayed in the window 750.

The object of the disclosed invention is to make viewing information on various types of screens, displays, monitors, and windows more convenient. A user will be able to find new information displayed in a window after scrolling, for example, when reading, searching, or browsing a document, without undue effort and distraction. The invention is of special advantage to users of mobile devices, which devices typically have small screens and require extensive scrolling, and for users browsing information on the World Wide Web, where scrolling to the last portion of a document is especially common. Besides helping users to locate new information on a page, the invention may help people more efficiently view already presented information, as well, by providing visual landmarks generally supporting user's orientation in the information presented after scrolling.

The present invention has been discussed in the context of five preferred embodiments. However, the disclosed method and system will operate effectively beyond these embodiments in other embodiments in accordance with the principles of the invention and the scope of included claims. Possible modifications can include the following ones, while they are in no way limited to them.

First, visual de-emphasis of processed information, for instance, in accordance with the first preferred embodiment, can be accomplished not only by "dimming", as described above, but in a variety of ways, including making the color of foreground and/or background less salient through changing brightness, saturation and hue, decreasing contrast, decreasing texture density, increasing vagueness of the visual image and its individual components, decreasing the size of visual components and changing their orientation, adding or eliminating gloss, visually degrading the visual image displaying processed information, and changing its perceived depth, lighting and shading.

A special case of visual de-emphasis of processed information is using display time asynchrony, that is, displaying processed information not immediately after scrolling but after a short delay. The image that serves as a placeholder for processed information, that is, the image presented immediately after scrolling simultaneously with not processed information in the area in which processed information is about to be displayed, can be a blank space, a blank document background, a specially assigned background, and the like. Not processed information can appear on the screen either at once or gradually.

Display time asynchrony can be used in a way different from described above: processed information can be displayed immediately after scrolling, while not processed information displayed after a delay. If user's task is not extremely time-critical, such a delay can help a user to differentiate processed and not processed information.

Second, visual emphasis of not processed information, for instance, in accordance with the second preferred embodiment, can be accomplished in a variety of ways, including changing the color of foreground and/or background to a more salient color through increasing its brightness and saturation and adjusting its hue, increasing contrast, increasing texture density, moving the image and its individual components, increasing the size of visual components and changing their orientation, using depth, shading, and lighting, adding or eliminating gloss, and changing other visual attributes of the image displaying the processed information to make it more salient.

The part of not processed information, which is visually emphasized, can vary. It can be the whole area displaying not processed information or objects and elements located near the point where user's attention is likely to be focused on after scrolling, such as the first line, first word, or first character of not processed text after scrolling down.

A variety of visual attributes can be employed to make processed information and not processed information visually different, including size, shape, location, orientation, pattern, color, brightness, hue, saturation, text font, text format, gloss, blinking of objects and their parts, movement, trembling, texture, gradient, shadow, line width, line pattern of object or objects and their backgrounds, and any other possible visual features, attributes, and effects, combinations of the above features, attributes, and effects, and their dynamic transformations.

Third, providing dynamic borders, for example in accordance with the fourth preferred embodiment, can be accomplished not only by temporarily moving a window border so that it encloses only the area displaying processed information, as described above. The dynamic border can be temporarily moved so that it encloses the area displaying not processed information. Besides, a temporary border separating processed and not processed information can be displayed in addition to a border enclosing the whole window area.

Fourth, marginal markers, for instance, in accordance with the fifth preferred embodiment, can be used when a window is scrolled in two dimensions at the same time, for instance both down and to the right. Besides, marginal markers can be implemented so that their orientation indicates a direction relative to a marker, in which direction not processed information is located. For instance, a marker emerging on the right text margin during vertical scrolling can have the shape of "\" when a window is scrolled down and the shape of "/" when a window is scrolled up. Also, marginal markers can mark the point where processed information ends (for instance, the last line of text fragment that overlaps from the previous view) instead of the point where not processed information begins.

Fifth, not only scrolling but all other cases in which a window displays a different portion of information, so that the new portion contains both new information and information displayed in the window before are covered by the invention. The basic principles of the invention can be applied, for instance, for resizing a window. If a window is enlarged and a new view contains both old and new information, temporary visual clues can provide a helpful reference point for a user.

Sixth, there are a number of known solutions, methods, and approaches allowing a user to customize the usage of the visual clues in accordance with the present invention. Enabling or disabling the clues, selecting a preferred type of the clues, selecting a preferred manner of rendering the clues, such as setting critical time intervals, active area rectangles, display time asynchrony of processed and not processed information, as well as association of different types of clues with different computer programs and different directions of scrolling, different devices, small or large increment scrolling, different types of scrolling, etc., can be accomplished by setting parameters via a known method, such as using a control panel, manipulating a user interface component displayed on a screen, using a command from an application or operating system menu, or done in any other known manner.

The visual clues in accordance with the present invention can be automatically disabled when location of processed information a window after scrolling can be easily anticipated by a user, that is, when processed information is frequently displayed in its regular place (default location), for instance, after scrolling down new text starts in a window from a second line. The visual clues can be enabled only if the location of processed information is different from its default location, for instance, when a text is scrolled to its last portion and processed information is not displayed in its default location, or if the default location is used infrequently, for instance, when a window is scrolled up or horizontally.

Furthermore, the method and system are described in the context of flow charts depicting a particular order of steps. However, nothing prevents certain steps from being performed in another order, including performing steps concurrently.

Other possible embodiments of the invention in accordance with the principles of the invention and the scope of included claims are obvious to those skilled in the art. Thus the scope of the invention should be determined by the appended claims and their legal equivalents, rather then by the examples given.

What is claimed is:

1. A method of displaying information in a window on a computer system including a display, said window displaying only part of its related information, the method comprising:
   providing a window for displaying information; further comprising the step of
     providing means for scrolling the window; and
   displaying in the window a first portion of its related information; and scrolling the window to a second portion of its related information, further comprising the step of
     causing visual clues, visually distinguishing new information from old information that overlaps from said first portion and has been displayed in the previous view for more than a first predetermined amount of time, to be displayed in the window after scrolling from said first portion to said second portion; and disabling the distinguishing visual clues after a second predetermined amount of time.

2. The method of claim 1, wherein providing the distinguishing visual clues is accomplished via visual de-emphasis of overlapping information, said de-emphasis accomplished through changing visual attributes of the visual image displaying overlapping information to make said visual image less salient.

3. The method of claim 1, wherein providing the distinguishing visual clues is accomplished via visual emphasis of at least a part of non-overlapping information through changing visual attributes of the visual image displaying non-overlapping information to make said visual image more salient.

4. The method of claim 1, wherein means are provided for defining an effective area as a rectangle within the window area; and wherein the distinguishing visual clues are displayed to separate new information displayed in the window after scrolling to said second portion from information that overlaps from the part of the first portion displayed in the effective area before scrolling to said second portion.

5. The method of claim 4 further comprising the steps of allowing a user to carry out small increment scrolling by using an input device that a user can use while simultaneously controlling the screen pointer; and allowing a user to dynamically define the effective area by moving screen pointer so that the Y screen coordinate of screen pointer is equal to the Y screen coordinate of the bottom of the effective area in the case of small increment downwards scrolling and/or the Y screen coordinate of screen pointer is equal the Y screen coordinate of the top of the effective area in the case of small increment upwards scrolling.

6. The method of claim 4, further comprising the step of:

providing a screen control or controls emerging in a window after small increment scrolling for a third predetermined amount of time; and allowing a user to define the effective area by dragging the emerging screen control or screen controls.

7. The method of claim 1, wherein means are provided for a user to set one or more settings selected from a group consisting of at least: the first predetermined amount of time, the second predetermined amount of time, direction of scrolling, types of directing visual clues and their behaviors, parameters of the effective area, whether controls and methods for defining effective area are enabled or disabled, correspondence between parameters of scrolling and types of the determining visual clues, whether the determining visual clues are enabled or disabled.

8. The method of claim 1, further comprising the steps of providing means for resizing the window; and displaying in the window after resizing a third portion of window's related information, said third portion possibly overlapping with the first portion; and causing visual clues, visually distinguishing information that overlaps from said first portion and new information that does not overlap from said first portion, to be displayed in the window after resizing; and disabling the after-resizing distinguishing visual clues after a third predetermined amount of time;

wherein the after-resizing distinguishing visual clues are displayed in the window after resizing if and only if the first portion of window's related information is displayed in the window before the resizing for more than a fourth predetermined amount of time.

9. The method of claim 1, wherein distinguishing visual clues are enabled only when the second portion is the last portion of the window related information.

10. An apparatus comprising at least a display device and a memory storage, further comprising:

means for displaying information in a window; and means for scrolling the window; and means for displaying in the window a first portion of its related information;

means for receiving scroll initiate events; and means for scrolling the window to a second portion of its related information; and means for causing visual clues, visually distinguishing new information from old information that overlaps from said first portion and has been displayed in the previous view for more than a first predetermined amount of time, to be displayed in the window after scrolling to said second portion; and means for disabling the distinguishing visual clues after a second predetermined amount of time.

11. The apparatus of claim 10, further comprising:

means for detecting the scrolling increment; and means for detecting the direction of scrolling; and means for detecting the input device or devices used for scrolling; and means for detecting the type of scroll initiate event; and means for selecting the distinguishing visual clues depending on one or more parameters selected from the group consisting of at least: scrolling increment, scrolling direction, location of processed information in a window after scrolling, input device used for scrolling, and type of scroll initiate event.

12. The apparatus of claim 10, further comprising:

means for allowing a user to set one or more settings selected from the group consisting of at least: the first predetermined amount of time, the second predetermined amount of time, types of distinguishing visual clues and their behavior, parameters of the defined rectangle, direction of scrolling, location of processed information in a window after scrolling, whether controls and methods for defining the defined rectangle are enabled or disabled, correspondence between parameters of scrolling and types of the distinguishing visual clues, whether the distinguishing visual clues are enabled or disabled, whether the distinguishing visual clues are enabled or disabled for different types of scrolling.

* * * * *